US010007678B2

(12) United States Patent
Tate et al.

(10) Patent No.: US 10,007,678 B2
(45) Date of Patent: Jun. 26, 2018

(54) IMAGE PROCESSING APPARATUS, IMAGE PROCESSING METHOD, AND RECORDING MEDIUM

(71) Applicant: CANON KABUSHIKI KAISHA, Tokyo (JP)

(72) Inventors: Shunta Tate, Tokyo (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 14/942,619

(22) Filed: Nov. 16, 2015

(65) Prior Publication Data
US 2016/0148070 A1 May 26, 2016

(30) Foreign Application Priority Data

Nov. 21, 2014 (JP) ................. 2014-236993

(51) Int. Cl.
G06K 9/48 (2006.01)
G06F 17/30 (2006.01)
G06K 9/00 (2006.01)
G06K 9/72 (2006.01)

(52) U.S. Cl.
CPC ... G06F 17/30244 (2013.01); G06K 9/00624 (2013.01); G06K 9/72 (2013.01)

(58) Field of Classification Search
CPC .. G06K 9/4604; G06K 9/4671; G06K 9/6202; G06K 9/00
USPC ............. 382/170, 171, 190, 195, 209, 282; 358/537, 538, 453
See application file for complete search history.

(56) References Cited

U.S. PATENT DOCUMENTS

| | | | | | |
|---|---|---|---|---|---|
| 6,138,045 | A | * | 10/2000 | Kupinski | G06T 7/0012 378/37 |
| 6,813,395 | B1 | * | 11/2004 | Kinjo | G06K 9/4604 382/282 |
| 7,321,370 | B2 | * | 1/2008 | Ishiyama | G06K 9/00268 345/423 |
| 7,324,665 | B2 | * | 1/2008 | Rohaly | G01P 5/001 382/107 |
| 7,421,154 | B2 | * | 9/2008 | Kinjo | G06K 9/4604 382/282 |
| 7,512,275 | B2 | * | 3/2009 | Yumoto | G06K 9/00087 382/224 |

(Continued)

FOREIGN PATENT DOCUMENTS

JP 2013-117860 A 6/2013

OTHER PUBLICATIONS

Achanta, R., et al., "SLIC Superpixels Compared to State-of-the-art Superpixel Methods", Journal of Latex Class Files, Dec. 2011, pp. 1-8, vol. 6, No. 1.

(Continued)

*Primary Examiner* — Yosef Kassa
(74) *Attorney, Agent, or Firm* — Canon USA Inc. IP Division

(57) ABSTRACT

An image processing apparatus, an image processing method, and a recording medium realize identification of an object region and a region category with high precision, estimate a relationship between partial regions in an acquired image by using a database about relationships between the images, and determine a target region in the acquired image based on the relationship.

18 Claims, 18 Drawing Sheets

(56) References Cited

U.S. PATENT DOCUMENTS

| | | | | |
|---|---|---|---|---|
| 7,673,145 B2* | 3/2010 | Hatano | ............... | G06K 9/00067 713/182 |
| 7,932,913 B2* | 4/2011 | Ishiyama | ............ | G06K 9/00268 345/423 |
| 8,058,888 B2* | 11/2011 | Wu | ....................... | G01R 1/0483 324/754.09 |
| 8,116,574 B2* | 2/2012 | Engels | ................. | G06K 9/6254 382/224 |
| 8,170,314 B2* | 5/2012 | Nozaki | ................ | G06K 9/6206 382/128 |
| 8,452,103 B2* | 5/2013 | Miyajima | ........... | G01C 21/3602 382/190 |

OTHER PUBLICATIONS

Rahtu, E., et al., "Learning a Category Independent Object Detection Cascade", IEEE International Conference on Computer Vision.
Sivic, J., et al., "Video Google: A Text Retrieval Approach to Object Matching in Videos", Proceedings of the Ninth IEEE International Conference on Computer Vision, 2011, pp. 1-8, vol. 2.

\* cited by examiner

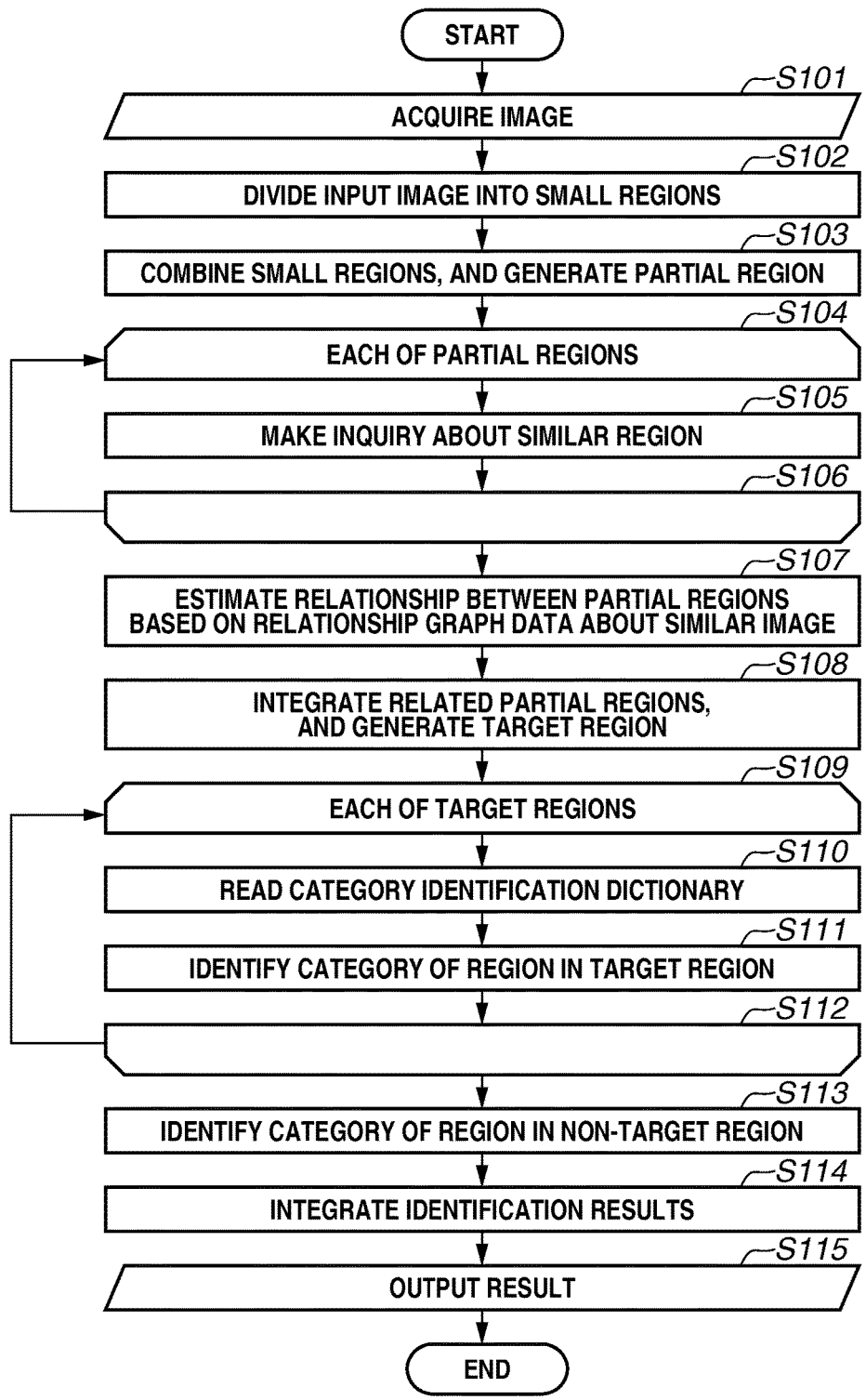

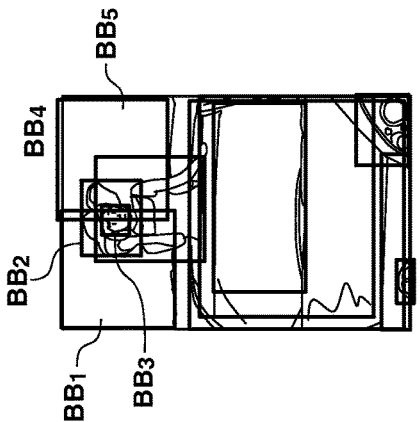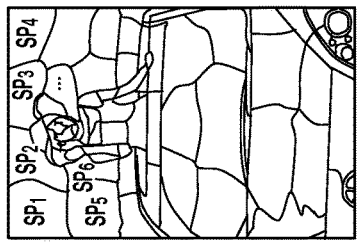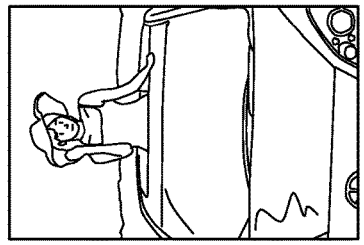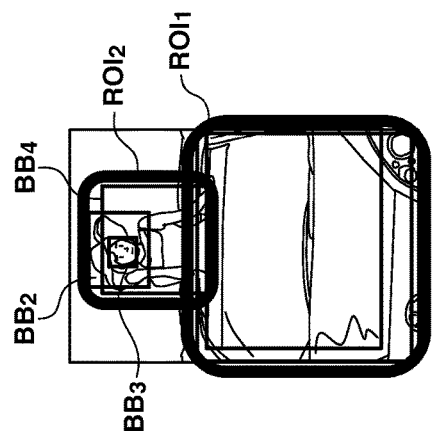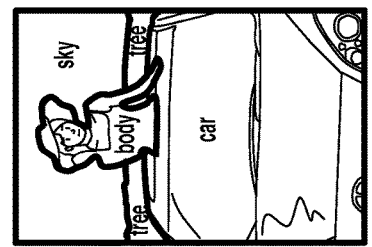

IMAGE DATABASE

INPUT IMAGE

Iinput

IMAGE DATABASE

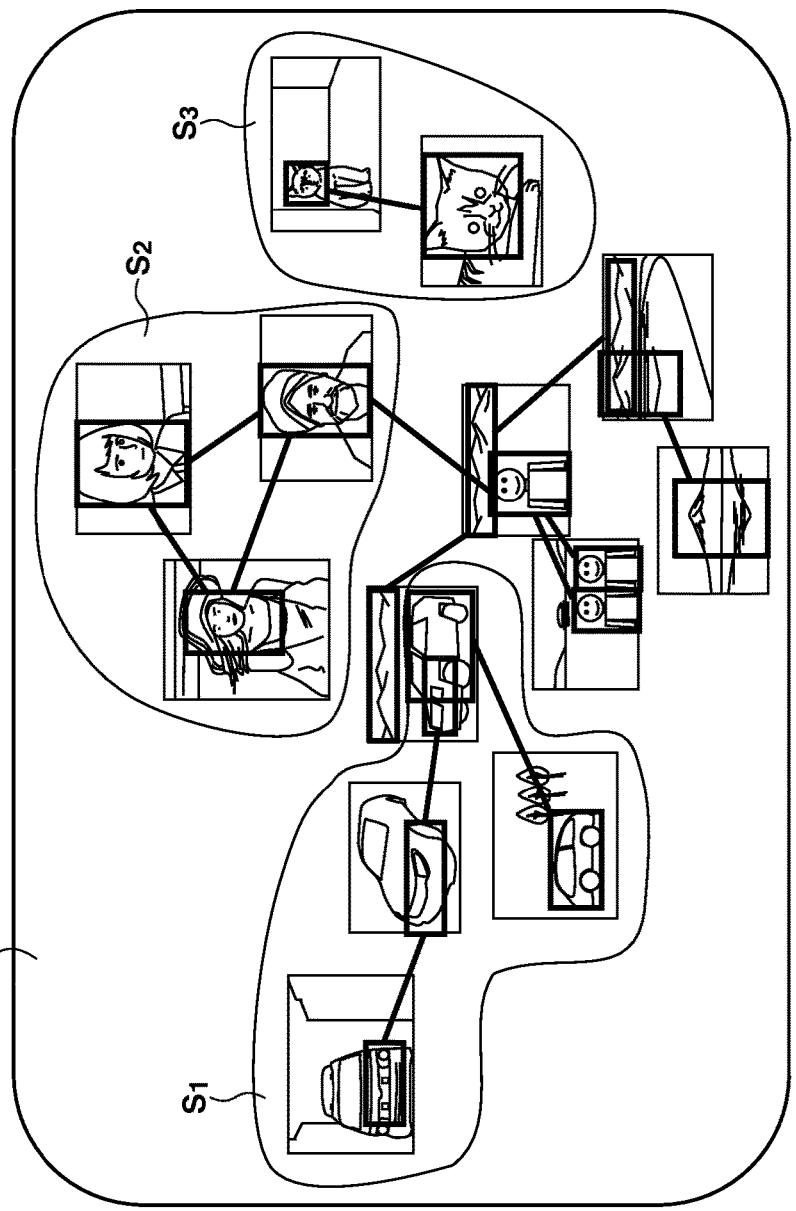

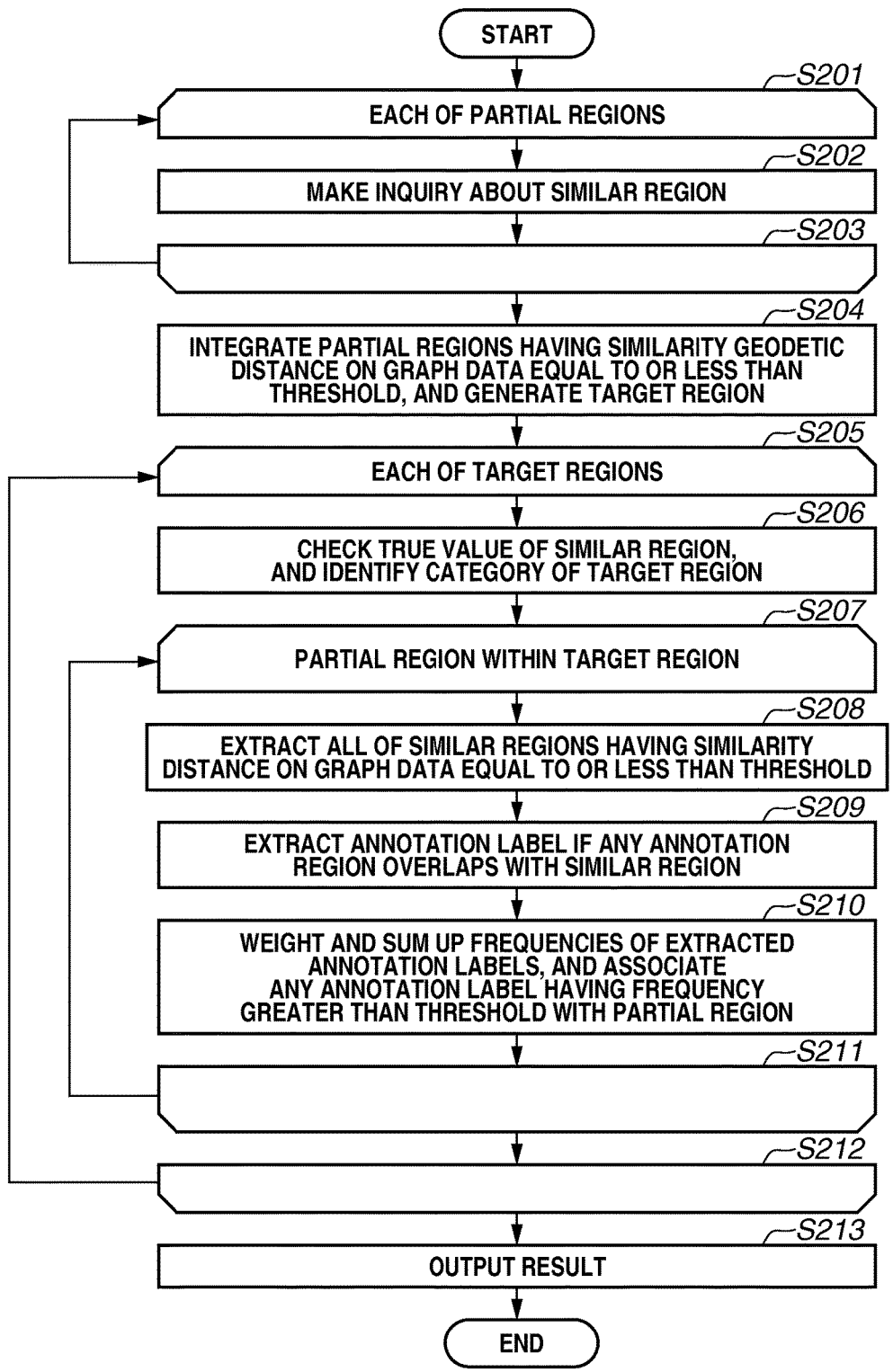

IMAGE AND RELATIONSHIP DATABASE

LEARNED DISTRIBUTION OF NG PATTERN p - q

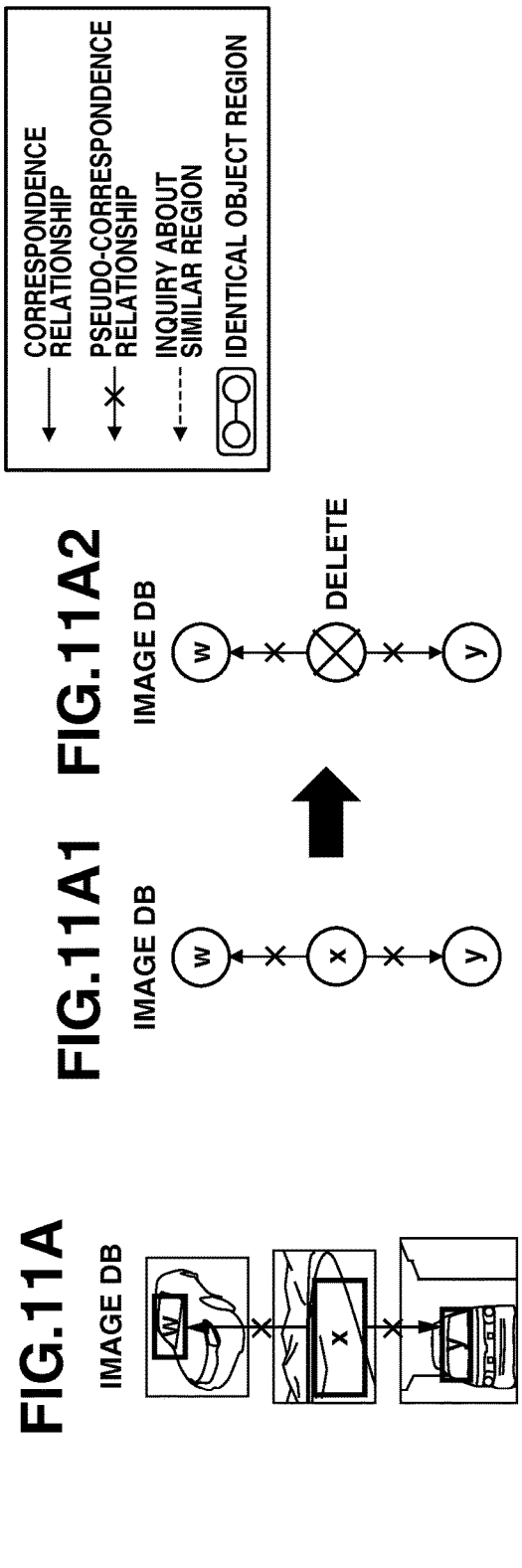

IMAGE AND RELATIONSHIP DATABASE

IMAGE PROCESSING APPARATUS, IMAGE PROCESSING METHOD, AND RECORDING MEDIUM

BACKGROUND OF THE INVENTION

Field of the Invention

The present invention relates to an image processing apparatus, an image processing method, and a recording medium for detecting an object in an input image and diving the input image into regions for each object.

Description of the Related Art

Conventionally, to execute post-processing such as image scene recognition or image quality correction according to an object, processing for detecting an object and dividing an image into regions for each object has been known. According to a method discussed in Japanese Patent Application Laid-Open No. 2013-117860, an input image is divided into a plurality of partial regions, and a similar image is inquired to a database for each of the partial regions, so that the input image is divided into regions by using the acquired similar image.

However, according to the method described in Japanese Patent Application Laid-Open No. 2013-117860, components of a main region common to all of the acquired similar images are acquired without taking account of a relationship between the similar images, and the input image is divided into regions as different objects for each superordinate component. Therefore, with the method discussed in Japanese Patent Application Laid-Open No. 2013-117860, detection accuracy of objects in regions other than a main region in the input image is low.

SUMMARY OF THE INVENTION

According to an aspect of the present invention, an image processing apparatus includes an acquisition unit configured to acquire an image for storage in a storage unit, a region dividing unit configured to divide the image acquired by the acquisition unit into a plurality of partial regions, an extraction unit configured to extract one or more pieces of similar image data from each of the plurality of divided partial regions from the storage unit, and a determination unit configured to determine a region, in the image, including partial regions having a relationship with each other, based on the image data extracted by the extraction unit and information about a relationship of the image data.

Further features of the present invention will become apparent from the following description of exemplary embodiments with reference to the attached drawings.

BRIEF DESCRIPTION OF THE DRAWINGS

FIG. 2 is a flowchart illustrating image recognition processing according to the first exemplary embodiment.

FIGS. 3A, 3B, 3C, 3D, and 3E are diagrams each illustrating a result of the image recognition processing according to the first exemplary embodiment.

FIG. 5 is a diagram illustrating a graph data example in which partial regions are connected to each other according to the first exemplary embodiment.

FIG. 7 is a flowchart illustrating image recognition processing according to a second exemplary embodiment.

FIGS. 11A, 11A1 and 11A2 and 11B, 11B1 and 11B2 are diagrams each illustrating a result of the image recognition processing according to the third exemplary embodiment.

DESCRIPTION OF THE EMBODIMENTS

An image processing apparatus according to an exemplary embodiment of the present invention extracts a plurality of partial regions from an acquired image, and acquires similar region(s) similar to the respective partial regions from an image database. The image database also stores information about a relationship between images. The image processing apparatus checks a relationship between the acquired similar regions based on the information, and determines that a common object is contained in partial regions similar to the respective similar regions that are highly related to each other or have an identical relationship. Then, the image processing apparatus combines the above-described partial regions, determines that combined region as a "target region (region of interest (ROI))", and estimates a category of the object for each target region. In the present exemplary embodiment, "information about a relationship between images" corresponds to information in which image regions are grouped for each object.

Hereinafter, exemplary embodiments of the present invention will be described in detail with reference to the appended drawings.

Figure 1:
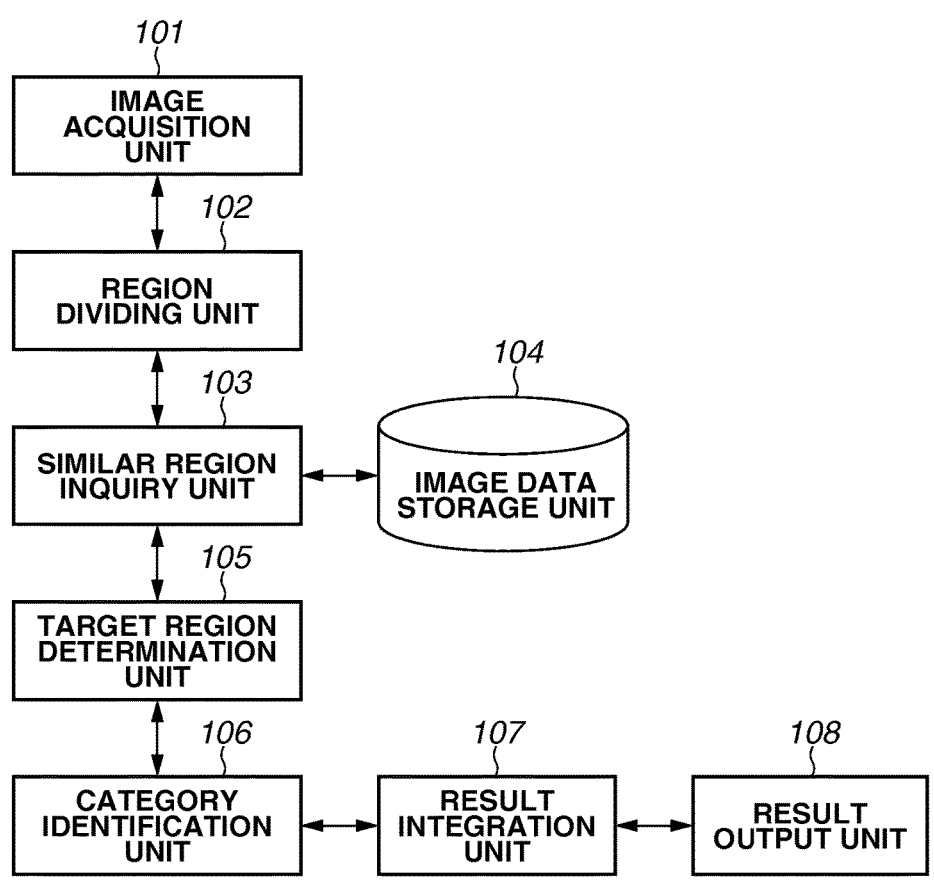
FIG. 1 is a block diagram illustrating an image processing apparatus according to a first exemplary embodiment.

A first exemplary embodiment of the present invention will be described. FIG. 1 is a block diagram illustrating a configuration (functional configuration) of an image processing apparatus according to the present exemplary embodiment. Each of the function units illustrated in FIG. 1 is realized when a central processing unit (CPU) included in the image processing apparatus executes a control program stored in a storage unit such as a read only memory (ROM) or a random access memory (RAM).

The image processing apparatus according to the present exemplary embodiment includes an image acquisition unit 101 that acquires an image received from an external apparatus or captured by a camera provided in the apparatus, and a region dividing unit 102 that divides the acquired image into a plurality of partial regions. In addition, the image processing apparatus includes a similar region inquiry unit 103 that inquires of an image data storage unit 104 about a region similar to the partial region, and the image data storage unit 104 that stores a plurality of images and information about relationships between the images. The image processing apparatus further includes a target region determination unit 105 that determines a region including an object in the acquired image to be a target region, and a category identification unit 106 that identifies an object category of the region in the acquired image. Furthermore, the image processing apparatus includes a result integration unit 107 that integrates identification results regarding the target region and a region other than the target region (non-target region), and a result output unit 108 that outputs a final identification result for the region.

Hereinafter, respective functions of the image processing apparatus will be described. FIG. 2 is a flowchart illustrating image recognition processing according to the present exemplary embodiment, and FIGS. 3A, 3B, 3C, 3D, and 3E are diagrams each illustrating a result of the image recognition processing according to the present exemplary embodiment.

First, in step S101 of the processing flow in FIG. 2, the image acquisition unit 101 acquires an image captured by a camera provided in the apparatus. FIG. 3A is a diagram illustrating an example of the image acquired by the image acquisition unit 101.

Next, in step S102, the region dividing unit 102 divides the image acquired by the image acquisition unit 101 into a plurality of small regions. This small region is called as a super-pixel (hereinafter, referred to as "SP") in which pixels having similar colors are put together, as discussed in R. Achanta, A. Shaji, K. Smith, A. Lucchi, P. Fua, and S. Susstrunk, SLIC Superpixels Compared to State-of-the-art Superpixel Methods, IEEE Transactions on Pattern Analysis and Machine Intelligence, vol. 34, num. 11, p. 2274-2282, 2012. In FIG. 3B, the image is divided into a plurality of SPs. FIG. 3B illustrates super pixels SPs, namely, $SP_1$ to $SP_6$. Since the SP is merely a small-size local region (small region) of similar colors, if the similar region inquiry unit 103 inquires about an image similar to the small region, it is less likely to find an image to match an object similar to that of the small region.

Next, in step S103, some of the above-described small regions are combined together, so that a partial region of a size suitable for making an inquiry about a similar object is created. As a method for combining pixels, for example, a plurality of adjacent pairs of SPs may be combined at random. However, if the pairs of SPs are merely combined at random, there may be a case where the partial region is created including a plurality of objects. Therefore, the small regions are desirably narrowed down to the small regions having a high possibility of "object likeness". In the present exemplary embodiment, a technique called "Objectness Estimation" is used as a method for narrowing down the small regions. This technique is discussed in E. Rahtu, J. Kannala, M. Blaschko, Learning a Category Independent Object Detection Cascade, IEEE International Conference on Computer Vision, 2011. In the Objectness Estimation, it is estimated whether the region forms a whole object through learning processing by using a plurality of features such as an uneven shape and an edge intensity of a contour in the region as clues. FIG. 3C is a diagram illustrating an example of a partial region acquired by the above-described Objectness Estimation method. FIG. 3C illustrates five partial regions, $BB_1$ to $BB_5$. Herein, a partial region $BB_1$ is formed by a combination of the super-pixels $SP_1$, $SP_2$, $SP_5$, and $SP_6$ in FIG. 3B. In order to simplify the diagram, the partial region is illustrated as a rectangular region circumscribing that partial region. However, the shape of the partial region is not particularly limited to a rectangle.

Next, in steps S104 to S106, the similar region inquiry unit 103 inquires of the image data storage unit 104 about whether an image including a similar region exists with respect to each of the partial regions $BB_1$ to $BB_n$, acquired through the above-described processing. In the present exemplary embodiment, a method discussed in J. Sivic, A. Zisserman, Video Google: A Text Retrieval Approach to Object Matching in Videos, ICCV 2003, is used. More specifically, at first, a local feature such as a scale-invariant feature transform (SIFT) feature is extracted from the partial region. Then, the similar region inquiry unit 103 searches the image data stored in the image data storage unit 104 for a region including a combination of similar local features, and extracts the top k pieces of images having highest similarities. In addition, "k" is an integer of 1 or more, and the similar region inquiry unit 103 makes an inquiry about one or more similar regions.

In the present exemplary embodiment, a feature in the partial region is used as a clue for making an inquiry. However, as another example, a feature in a peripheral region of the partial region may be also used in addition to the feature in the partial region. More specifically, at first, (1) a feature quantity is extracted from a partial region. Then, (2) a region in which the partial region is enlarged by a predetermined width is generated, and a feature quantity of the resultant partial region is extracted. Thereafter, (3) the two feature quantities are combined together, so that the similar region inquiry unit 103 makes an inquiry about the similar region by using the combined feature quantity, and extracts the top k-pieces of images.

Further, as another example, the similar region inquiry unit 103 may use the feature quantity of each of the partial region extracted in (1) and the feature quantity of the peripheral region extracted in (2) to calculate the similarities between the regions, and search for the similar region based on a value acquired by weighting and adding the two similarities. Furthermore, as yet another example, the similar region inquiry unit 103 may regard the entire image as the peripheral region and search for the similar region by using a feature quantity of the entire image. According to the above-described derived examples, the similar region inquiry unit 103 can search not only for the similar region with respect to the partial region but also for the similar region with respect to the region containing the periphery of the partial region.

Figure 4A:
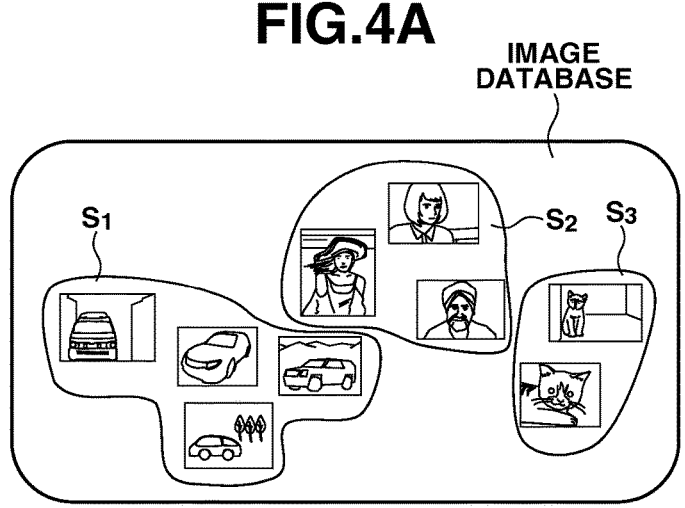
FIGS. 4A, 4B, and 4C are diagrams each illustrating a configuration of an image data storage unit 104 according to the first exemplary embodiment.
Figure 4B:
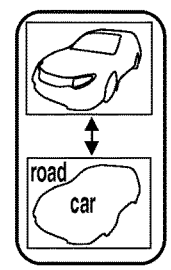
Figure 4C:
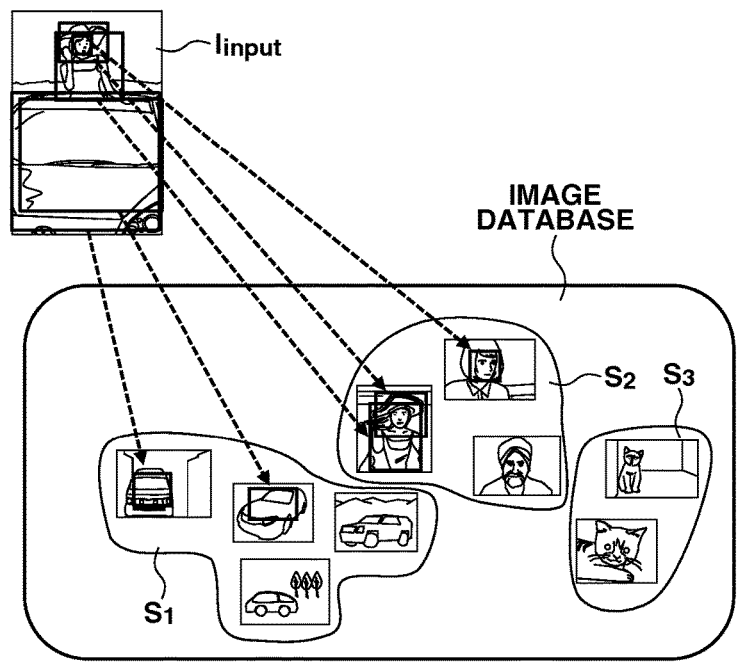

Subsequently, a configuration of the image data storage unit 104 will be described in detail. FIGS. 4A, 4B, and 4C are diagrams each illustrating a configuration of the image data storage unit 104 according to the present exemplary embodiment. As illustrated in FIG. 4A, the image data storage unit 104 stores an image database containing subgroups $S_1$ to $S_m$ into which a plurality of images and objects in the images are divided. These subgroups $S_1$ to $S_m$ are previously created based on a similarity relationship between the images, and a creation method thereof will be specifically described below. As illustrated in FIG. 4B, the image data storage unit 104 stores teacher information about the object category of the region in the image. Although only several images are illustrated in FIG. 4A, the database for practical use desirably includes images of several tens of thousands or more, and subgroups of several hundred or more.

FIG. 4C is a diagram illustrating a result of similar region inquiry processing. In FIG. 4C, a partial region and a similar region that matches the partial region are indicated by rectangular shapes with black-bold lines, and the matched regions are connected to each other by a directional line. In FIG. 4C, only one highest-ranked similar region is illustrated as a similar region that matches a partial region. The similar region inquiry processing has been specifically described as the above.

Next, in step S107, based on the similar region inquiry result, the target region determination unit 105 estimates which partial regions in the acquired image are related to each other. In the present exemplary embodiment, the target region determination unit 105 searches for a similar region that matches an individual partial region, and determines that partial regions having the similar regions included in the same subgroup are highly related to each other. As described below, the subgroup is previously created based on the similarity relationship between the images.

In step S108, from among pairs of the partial regions determined to be highly related to each other in step S107, the target region determination unit 105 extracts a pair of partial regions overlapping with each other by a range equal to or greater than a predetermined size, and integrates the paired partial regions. For example, an overlap value OV is determined by the following formula 1.

$$OV = \frac{|BB_i \cap BB_j|}{|BB_i \cup BB_j|} \qquad \text{<Formula 1>}$$

In the above formula 1, the number of pixels of a sum set of the partial regions i and j is a denominator, and the number of pixels of a product set of the partial regions i and j is a numerator. If paired partial regions have the overlap value OV that is equal to or greater than a predetermined value, the pair of the partial regions is more likely to be a region containing an identical object. In step S108, all of the partial regions related to each other as a pair, which satisfies the above-described condition, are put together. Then, a range of the region that includes the above partial regions is treated as the target region.

FIG. 3D is a diagram illustrating the target region, which is generated by integrating partial regions according to the present exemplary embodiment. In the present exemplary embodiment, the partial regions $BB_2$, $BB_3$, and $BB_4$ are integrated to generate a target region $ROI_1$. In order to simplify the diagram, the target region $ROI_1$ is illustrated as a rectangular region. However, the target region $ROI_1$ is not particularly limited to a rectangular shape, and the shape thereof may be an irregular shape such as the sum set of the partial regions.

The image recognition processing will be further described with reference to FIG. 2. In steps S109 to S111, the category identification unit 106 identifies an object category for a region within each target region. In the present exemplary embodiment, for identification of the object category, a classifier trained to receive a feature quantity of a small region (SP) within a target region and to output a category of the small region is used. A known method such as "random forest" or "support vector machine" can be used as the classifier. In the present exemplary embodiment, the above classifier is previously trained for each subgroup in an image database, and image data of the subgroup is intensively given thereto when the training is performed.

After the target region is generated, in step S110, the category identification unit 106 reads a dictionary for identifying a subgroup corresponding to each of the target regions. Then, in step S111, the category identification unit 106 identifies a region category using the classifier. In the present exemplary embodiment, the target region is generated as described above, and detailed region identification processing is executed on each of the target regions. Therefore, according to the present exemplary embodiment, the region category can be estimated with higher precision compared with the conventional method in which the target region is not generated.

Alternatively, a method without using the classifier can be also employed in steps S110 and S111. In such a method, a plurality of image groups that constitutes the subgroup corresponding to the target region is acquired at first. Then, a true value of a region label is applied to each of the acquired image groups. Then, k-pieces of small regions (SPs) having the similar feature are acquired from the image group for each of the small regions (SP) in the target region, and a category having the highest frequency is determined to be the category of that region, so that the category of the region with respect to the target region can be identified.

In step S113, the category identification unit 106 identifies the category of the region for the non-target region. The category identification unit 106 determines the region category using a normal identification dictionary that is trained without setting any limitation on the object.

In step S114, the result integration unit 107 integrates the identification result for the target region the category of which is identified with the identification result for the non-target region, and acquires the final identification result. If the target regions do not overlap each other, the category identification results for respective regions are determined to be the final identification result. With respect to the target regions where overlap exists, the result integration unit 107 may average the likelihood scores of the categories, or acquire the greatest likelihood scores of the category to acquire the final identification result. An example of the final identification result is illustrated in FIG. 3E.

In step S115, the result output unit 108 outputs the final identification result to an image display device and ends the processing. In the present exemplary embodiment, although the result output unit 108 outputs the final identification result including region category information about the target region and the non-target region, the result output unit 108 may output only a position of the target region. Furthermore, the result output unit 108 may output a simple result in which a pair of partial regions related to each other is only identified. A flow of the image recognition processing according to the present exemplary embodiment has been described above.

Herein, details of the image database included in the image data storage unit 104 and an object subgroup generation method will be described. In creating the subgroup, a learning program firstly creates relationship graph data about partial regions in the image. FIG. 5 is a diagram illustrating graph data in which partial regions in the image serve as nodes, and the nodes of similar partial regions are connected to each other. Subsequently, the learning program executes clustering on the graph data to divide the partial region data into a plurality of subgroups. The processing for creating the graph data executed by the leaning program will be described below in detail.

In the present exemplary embodiment, at first, a partial region is generated from image data. Similar to the above-described method executed on the acquired image, a plurality of partial regions is acquired for each image in the image database. Then, nodes of the graph are generated with the same number of the acquired partial regions, so that the nodes correspond to the partial regions. Subsequently, a partial region pair having high similarity is searched for. If a partial region pair having the similarity equal to or greater than a predetermined value exists, an edge is added between the nodes corresponding to the partial region pair. At this time, in the present exemplary embodiment, a similarity distance between the partial regions is given as a weight of the edge.

A standard can be specified in various ways with respect to the similarity between partial regions. In the present exemplary embodiment, a sum of two values is used as the similarity between the partial regions. More specifically, two values are (1) matching degree of the object category of partial regions and (2) matching degree of the appearance feature of partial regions. Since a true value of the category of the partial region is used in addition to the appearance similarity, for example, it is possible to prevent a pseudo correspondence relationship between non-related objects having similar appearances, such as a water surface and a front window of an automobile. As a result, it is possible to acquire the graph data with better quality.

In the present exemplary embodiment, a value of (1) matching degree of the object category is calculated with the following formula 2. In other words, as illustrated in FIG. 4B, since a category teacher value indicating a correct category is previously applied to each pixel of the partial region in the image, a matching degree of the applied category teacher values within the partial area is calculated. More specifically, two partial regions $BB_i$ and $BB_j$ are normalized to have the same height and width. Next, a category similarity distance $d^{cat}$ between the two partial regions $BB_i$ and $BB_j$ is acquired according to the following formula 2.

$$d_{ij}^{cat} = 1 - \frac{1}{|x||y|} \max_{\Delta x, \Delta y} \sum_x \sum_y \sum_c q_i(x + \Delta x, y + \Delta y, c) q_j(x, y, c) \qquad \text{<Formula 2>}$$

Herein, |x| and |y| represent the number of pixels arranged in a horizontal direction and a vertical direction of the partial region. Further, q(x, y, c) is an index function that takes a value of 1 when a category teacher value of a pixel (x, y) in the partial region is "c", and takes a value of 0 when the category teacher value is other than "c". Variables $\Delta x$ and $\Delta y$ are used for allowing positional deviation when the categories of two partial regions are compared. The variables $\Delta x$ and $\Delta y$ represent an operation for searching for a position where the two partial regions match the most by shifting the position to the up, down, right, or left by an amount approximately equal to one-fourth of the width of the partial region as a standard. The category similarity distance $d^{cat}$ takes a value of 0 when the categories of two partial regions completely match with each other, and takes a value of 1 when the categories thereof are completely different.

In the present exemplary embodiment, the similarity is defined by using data about the pixel-unit category teacher value. However, preparing the above-described teacher values for all images requires time and cost. Therefore, for example, a matching degree of the object category of the partial region may be calculated by using scene category information about the image. A scene category teacher value is previously applied to all images, and the similarity distance takes a value of 0 when the scene categories of the two images that include the two partial regions are the same, and the similarity distance takes a value of 1 when the scene categories of the two images are not the same. Alternatively, as another exemplary embodiment, by previously executing the image recognition processing on individual images through an object detection unit, it is possible to determine that the matching degree of a partial region pair in a periphery of the regions where the same type of objects are detected is high.

Subsequently, a standard method known as "bag of words" is used for the calculation of (2) matching degree of the appearance feature of the partial region. More specifically, a plurality of SIFT features is extracted from each of the partial regions $BB_i$ and $BB_j$ in a reticular state, and a codebook frequency histogram of the feature is created. Then, a value of histogram intersection is calculated with the following formula 3.

$$d_{ij}^{feat} = 1 - \sum_k \min(f_i(k), f_j(k)) \qquad \text{<Formula 3>}$$

Herein, f(k) represents a frequency value of the k-th SIFT codebook, whereas $\Sigma f(k)$ is equal to 1 ($\Sigma f(k)=1$). A value $d^{feat}$ takes a value of 0 if feature vectors of two partial regions match completely, and takes a value of 1 if the feature vectors thereof do not match entirely. Further, in order to calculate the matching degree of the appearance feature of the partial region, a matching degree of shape information or edge in the partial regions can be used in addition to the frequency value of the SIFT codebook. Furthermore, a feature of the periphery regions may be used together with the feature within the partial regions.

The similarity distance $d_{ij}$ of the partial regions i and j is acquired by adding the two similarity distances calculated in the above-described manner. In the following formula 4, a weight parameter $\alpha$ takes a value of 0 to 1. To enhance the final recognition accuracy of the image processing apparatus, a value of the weight parameter $\alpha$ is previously determined by using a general method such as a cross validation method.

$$d_{ij} = \alpha d_{ij}^{cat} + (1-\alpha) d_{ij}^{feat} \qquad \text{<Formula 4>}$$

By setting the standard of the similarity as described above, it is possible to acquire a graph in which the partial regions having a similar appearance in the same object category are connected to each other with the weighted edge. FIG. 5 is a diagram illustrating graph data acquired in such a manner, in which the partial regions similar to each other are connected. By applying a known graph-based clustering method such as the spectral clustering to the graph data, respective partial regions are divided into a plurality of clusters. FIG. 5 illustrates subgroups $S_1$ to $S_3$ as the clusters. In addition, in FIG. 5, a small-size cluster is not specified as the subgroup and omitted from the graph data. If a number of small subgroups are created, this may result in noise or an increase in calculation amounts when recognition processing is executed.

Figure 6:
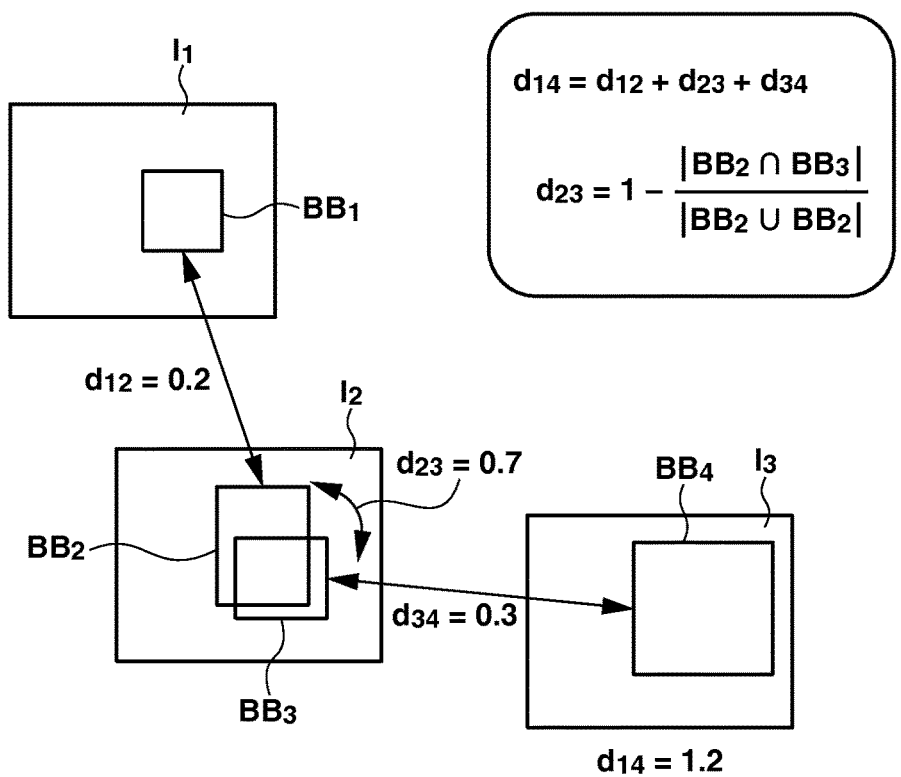
FIG. 6 is a diagram schematically illustrating a similarity according to the first exemplary embodiment.

Further, the similarity between the partial regions within the same image may be defined based on the overlap value OV obtained using the formula 1 in addition to the appearance feature. FIG. 6 is a diagram schematically illustrating the similarity according to the present exemplary embodiment. As a definition of the similarity, a similarity $d_{23}$ between overlapping partial regions $BB_2$ and $BB_3$ existing in an image $I_2$ is newly defined with an overlap value of the partial regions $BB_2$ and $BB_3$. Further, the similarity is regarded as a type of distance, in a case where a path that can be traced by an edge of the similarity exists between a partial region $BB_1$ of an image $I_1$ and a partial region $BB_4$ of an image $I_3$, a distance $d_{14}$ is defined with a value acquired by adding respective distances of $d_{12}$, $d_{23}$, and $d_{34}$ (i.e., $d_{14}=d_{12}+d_{23}+d_{34}$). In addition, in a case where a plurality of paths may exist between the nodes i and j of the graph, the shortest path is defined as a distance $d_{ij}$ (i.e., geodetic distance). With the above-described definition, the similarity is evaluated as high for two partial regions in such a relationship that one contains the entire object and the other contains a part of the object (i.e., "is-a-part-of relationship"), such as a human body and its face, or an automobile and its front grille. Therefore, according to the present exemplary embodiment, the objects are more likely to be organized and included into the same subgroup.

As described above, according to the present exemplary embodiment, by estimating the relationship between the partial regions and determining the target region based on the relationship of the partial regions, identification of the object region and identification of the region category can be realized with high precision. In the above explanation, when the target region determination unit 105 estimates a relationship between partial regions in an input image, the graph data of the relationship between the similar images is used. The present embodiment can simplify the process by not using the graph data. Category information is given to each partial region of an image in an image data base as a teacher value. The category identification unit 106 extracts a plurality of similar images for each of the partial regions of the input image. Next, the category identification unit 106 normalizes the appearance frequency of the category given to the similar image group and makes a distribution of the frequency probability of the category. The target region determination unit 105 connects partial regions with each other whose distribution of the frequency probability is close in and makes a target region. Alternatively, for each of the partial regions, the target region determination unit 105 may decide a category having high frequency in the similar image group as a category of the partial region.

General indexes such as Kullback-Leibler divergence can be used for comparison of the distribution. In addition, the category information includes information about the background region and the category information of the object in the partial region concerned. The category information may include the part of the object or information about the whole scene of the image.

Subsequently, as a second exemplary embodiment of the present invention, description will be given to a configuration in which object detection is executed in order to identify the object existing in an image and a range of the object while meta information about the detected object is acquired. In the present exemplary embodiment, the meta information is defined as overall additional information about the entire image and the object in the image. Accordingly, the meta information according to the present exemplary embodiment contains information which is applied to an image or a specified local region by a user, such as an attribute of a person as an object (i.e., gender or occupation) or scene information (i.e., scenery of the sea or a sunset). Further, the meta information also includes image-capturing information which is applied by an imaging apparatus, such as global positioning system (GPS) data about an image-capturing location or imaging parameters such as a focal distance of a camera. Hereinafter, a configuration for acquiring annotation information indicating a position and a name of a local portion of the object will be described.

In addition, the same reference numerals are applied to the configurations already described in the first exemplary embodiment, and description thereof will be omitted. An image processing apparatus according to the present exemplary embodiment includes the configuration (function unit) similar to that of the image processing apparatus according to the first exemplary embodiment illustrated in FIG. 1. Further, similar to the first exemplary embodiment, the image processing apparatus according to the present exemplary embodiment identifies the target region based on the image data and the relationship between one image data and another image data. In the present exemplary embodiment, graph-structure information in which a partial region in the image is specified as a node, and the similarity in appearance and category of the partial region in the image is specified as an edge is used as the information about the relationship between one image data and another image data. Hereinafter, the present exemplary embodiment will be described in detail with reference to the appended drawings.

FIG. 7 is a flowchart illustrating image recognition processing according to the present exemplary embodiment. In the present exemplary embodiment, similar to the first exemplary embodiment, partial regions are extracted from the acquired image, and similar regions are inquired. The present exemplary embodiment is different from the first exemplary embodiment in the partial regions integration processing executed in step S204. In the first exemplary embodiment, the partial regions that have similar regions belonging to the same subgroup are integrated. However, in the present exemplary embodiment, since the subgroup is not used, integration processing employs a different method.

In steps S201 to S203, the similar region inquiry unit 103 acquires similar regions for respective partial regions. Next, in step S204, the target region determination unit 105 selects a pair of partial regions that overlap by an amount equal to or greater than a predetermined value, and acquires the similarity of the corresponding similar regions. This similarity is calculated with the geodetic distance method described in the first exemplary embodiment, and a pair of the partial regions having the similarity equal to or greater than the predetermined value is integrated to generate a target region.

Figure 8A:
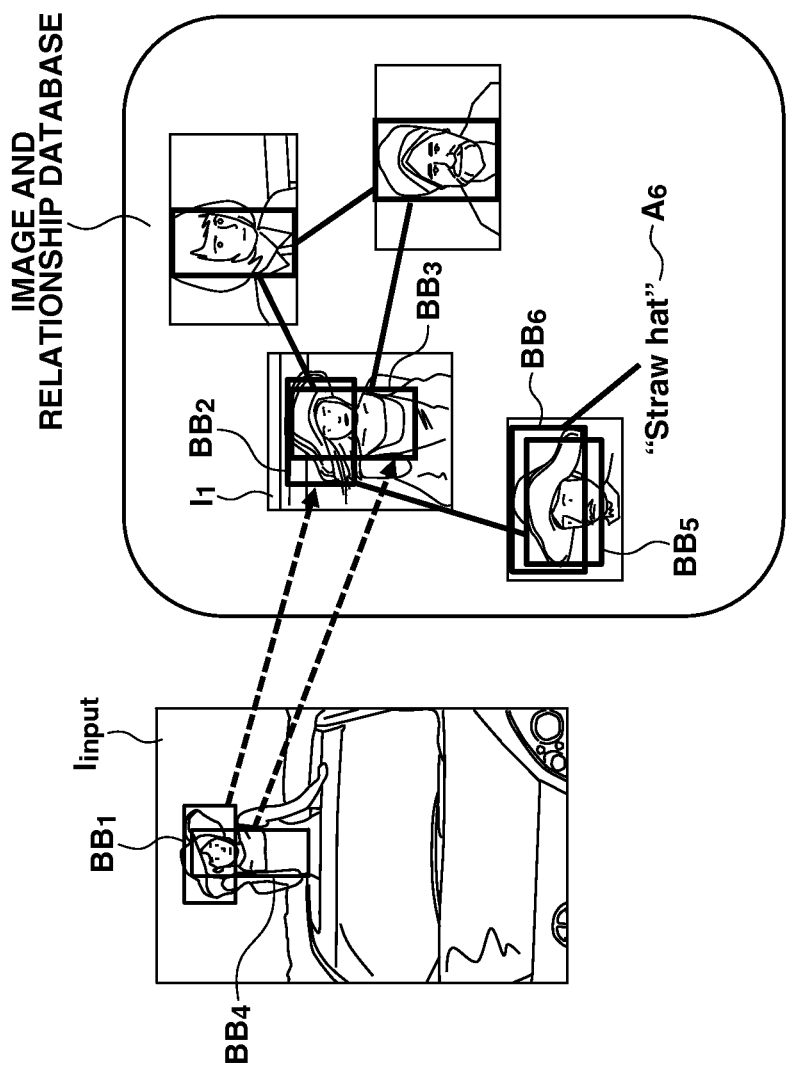
FIGS. 8A and 8B are diagrams each illustrating a result of the image recognition processing according to the second exemplary embodiment.
Figure 8B:
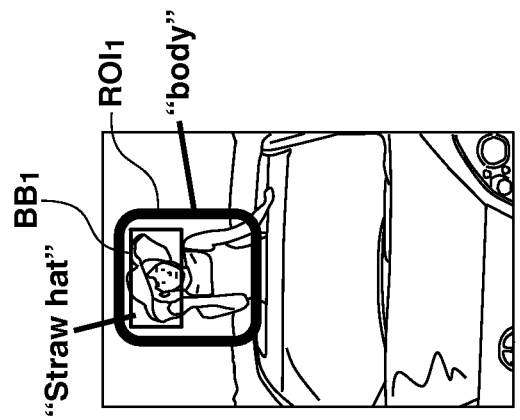

FIGS. 8A and 8B are diagrams each illustrating a result of the image recognition processing according to the present exemplary embodiment. In the present exemplary embodiment, as illustrated in FIG. 8A, a distance between two partial regions $BB_1$ and $BB_4$ constituting the human body in the input image is calculated through $BB_1 \rightarrow BB_2 \rightarrow BB_3 \rightarrow BB_4$ and similar images of other persons. Further, although only one similar region is inquired and used in step S202 according to the present exemplary embodiment, top k pieces of similar regions may be inquired. In such a case, a combination of similarities having the smallest value from among $k^2$ pieces of combinations of the similarities is calculated as a distance.

Further, in step S204, two partial regions overlapping on the acquired image is selected as a partial region pair to be a candidate of the target region, and the partial region pair is integrated after checking whether similar images corresponding to that partial region pair are similar to each other. In addition, when a partial region pair is selected as a candidate, two partial regions may be selected based on not only whether the two partial regions overlap with each other but also whether the two partial regions have a predetermined relative positional relationship.

Next, in step S206, the category identification unit 106 determines a category of the target region. More specifically, a true value of the category of the similar region corresponding to each of the target regions is checked, and a category having a mode value is identified as the category of the target region. As a result, through the image recognition processing according to the present exemplary embodiment, a determined target region $ROI_1$ and a label "body" that represents the category of the target region $ROI_1$ are acquired as illustrated in FIG. 8B.

Further, in the present exemplary embodiment, the user has previously applied an annotation of an object to a part of image regions in the image database, and processing for acquiring an annotation label is executed on all or a part of the acquired image. For example, as illustrated in FIG. 8A, an annotation label $A_6$, "Straw hat", is applied to an annotation region $BB_6$ specified by the user.

In step S208, the similar region inquiry unit 103 inquires about and acquire similar region(s) for each of the partial regions in the target region. In the present exemplary embodiment, the similar region inquiry unit 103 inquires about the similar region for a partial region $BB_1$, and acquires a similar region $BB_2$. Then, all of the similar regions having a distance less than a predetermined threshold are extracted using the geodetic distance. Similar regions $BB_2$, $BB_3$, and $BB_5$ are acquired as the similar regions of the partial region $BB_1$.

In step S209, if any of the similar regions acquired in the previous step S207 overlaps with the annotation region by an amount equal to or greater than a predetermined threshold, the category identification unit 106 extracts and stores the annotation label. For example, the annotation region $BB_6$ overlaps with the similar region $BB_5$, so that the annotation label $A_6$ named "Straw hat" is stored.

Next, in step S210, the result integration unit 107 sums up the frequencies of all of the annotation labels acquired for the partial region $BB_1$. At this time, a similarity distance between the partial region $BB_1$ and each of the annotation regions (herein, annotation region $BB_6$) is acquired, and the frequencies of the annotation labels are weighted and summed up according to the distance. If there is an annotation label having a sum of the frequency greater than a threshold, in step S213, the result output unit 108 outputs the annotation label in association with the partial region $BB_1$. FIG. 8B is a diagram illustrating a state in which the annotation label is output according to the present exemplary embodiment.

When annotation label candidates are counted, a threshold greater than a threshold used for identifying the target region may be used, so that a wider range of similar region is checked when the annotation labels are counted. Further, ontology data in which words are hierarchically categorized may be used to count the annotation labels so that relationships between the annotation labels are taken into consideration. Generally, for example, a word "Straw hat" is categorized as a subordinate concept to a word "Hat" in the ontology data. Therefore, when one annotation label "Straw hat" is counted, one annotation label "Hat", which is categorized as a superordinate concept, is also counted with reference to the ontology data. Then, counting and summation of the annotation labels are executed for each word, and all of the annotation labels having the sums greater than the threshold are output. At this time, in a case where it is desired to avoid outputting a plurality of annotation labels applied to words with overlapping meanings, such as "Straw hat" and "Hat", the result output unit 108 may output the annotation label applied to a word in the lowest hierarchical order from among the annotation labels having the sums greater than the threshold.

Alternatively, the annotation label information may be prepared without specifically setting the annotation region, so that one annotation label can correspond to one image. In such a case, the annotation region is regarded as the entire image, and the processing is similarly executed as described above.

As described above, according to the present exemplary embodiment, the annotation of the partial region in the acquired image can be estimated based on the annotation data included in the image database. Further, even if the subgroup is not created in the image database, the target region can be determined and the category can be identified with respect to the acquired image.

Subsequently, as a third exemplary embodiment of the present invention, a configuration will be described in which, when the learning program learns a similar region likely to be selected incorrectly (hereinafter, also referred to as a "NG pattern"), such a similar region is eliminated from the image database. With this configuration, it is possible to reduce the possibility of incorrectly identifying a category.

For example, when an acquired image contains a close-up image of an automobile, a front window having a shiny surface may look like a surface of a lake in a scenic image because of light reflected thereon. In such a case, a partial region of the surface of the lake is associated with the partial region of the front window of the automobile as a similar region thereof, and as a result, the front window may be identified and categorized as a water surface. In the present exemplary embodiment, to reduce the above-described incorrect identification, a database of the relationship between images is extended. More specifically, information about the incorrect correspondence relationship between the partial regions is added to the database in addition to the information about the appearance similarity between the partial regions in the image.

Further, the same numerals are applied to the configurations already described in the first and the second exemplary embodiments, and description thereof will be omitted. An image processing apparatus according to the present exemplary embodiment includes the configuration (function unit) similar to that of the image processing apparatus according to the first exemplary embodiment illustrated in FIG. 1. Hereinafter, the present exemplary embodiment will be described in detail with reference to the appended drawings.

First, "pseudo-correspondence relationship" defined in the present exemplary embodiment will be described. The pseudo-correspondence relationship refers to a relationship between a pair of regions, such as a region of a glass and a region of a water surface, in which a matching degree of the true values of the categories is low while a matching degree of the appearance feature is high. Accordingly, the pseudo-correspondence relationship is equivalent to the region pair in which the value $d^{feat}$ acquired using the formula 3 is close to 0 and the value $d^{Cat}$ acquired using the formula 2 is close to 1. Then, for a value measuring the pseudo-correspondence relationship, the following formula 5 is defined by changing the above-described formula 4.

$$d'_{ij} = \alpha(1 - d_{ij}^{cat}) + (1-\alpha)d_{ij}^{feat} \qquad \text{<Formula 5>}$$

Figure 10A:
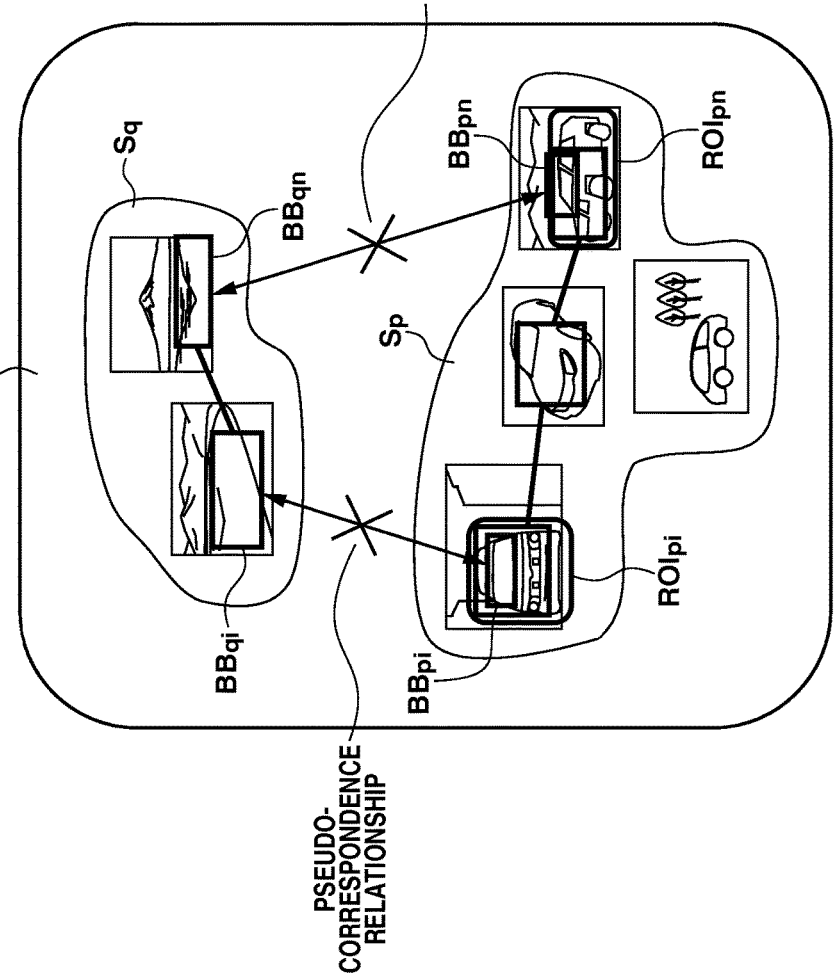
FIGS. 10A and 10B are diagrams each schematically illustrating a database according to a third exemplary embodiment.
Figure 10B:
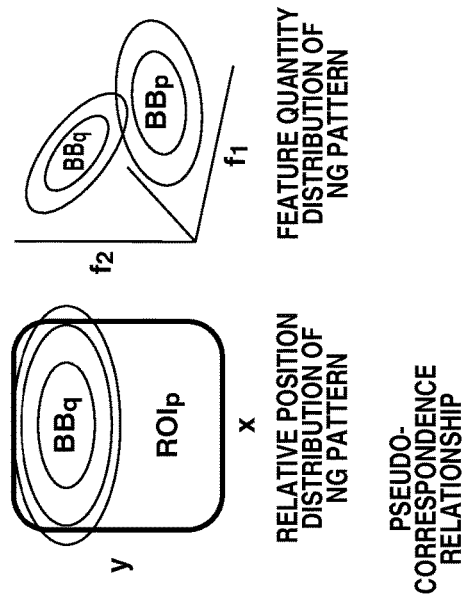

FIGS. 10A and 10B are diagrams schematically illustrating a database according to the present exemplary embodiment. As illustrated in FIG. 10A, an edge that represents the pseudo-correspondence relationship is applied to the region pair having a distance value, acquired from the above formula 5, less than a predetermined value. In addition, the same feature used for making an inquiry of the similar image has to be used as the appearance feature represented by the value $d^{feat}$.

As a simple method for reducing the number of pseudo-correspondence relationships, regions in the image database may be checked individually, and if a region having a predetermined number of pseudo-correspondence relationships exists, the region is regarded as an NG pattern and deleted from the relationship graph in the image database. FIG. 11A is a conceptual diagram illustrating the above-described method. For example, as illustrated in FIG. 11A1 on the left side of FIG. 11A, in a case where a region x is in the pseudo-correspondence relationship both with regions w and y in the image database, the region x is deleted from the relationship graph in the image database because the region x has low reliability in terms of the inquiry result for similar regions. Then, FIG. 11A2 on the right side of FIG. 11A1 is a schematic diagram illustrating the image database after deleting the region x. According to the above-described method, a region having a small amount of information such as a uniform region without texture is eliminated from the image database.

In the present exemplary embodiment, as another method, the learning program learns and identifies a pseudo-correspondence pattern likely to occur in the combination of specific objects, and eliminates the pseudo-correspondence pattern from the image database. This method is effective to the above-described case in which the surface of the lake in a scenic image incorrectly corresponds to the front window of the automobile. This processing flow is illustrated in FIG. 9.

Figure 9:
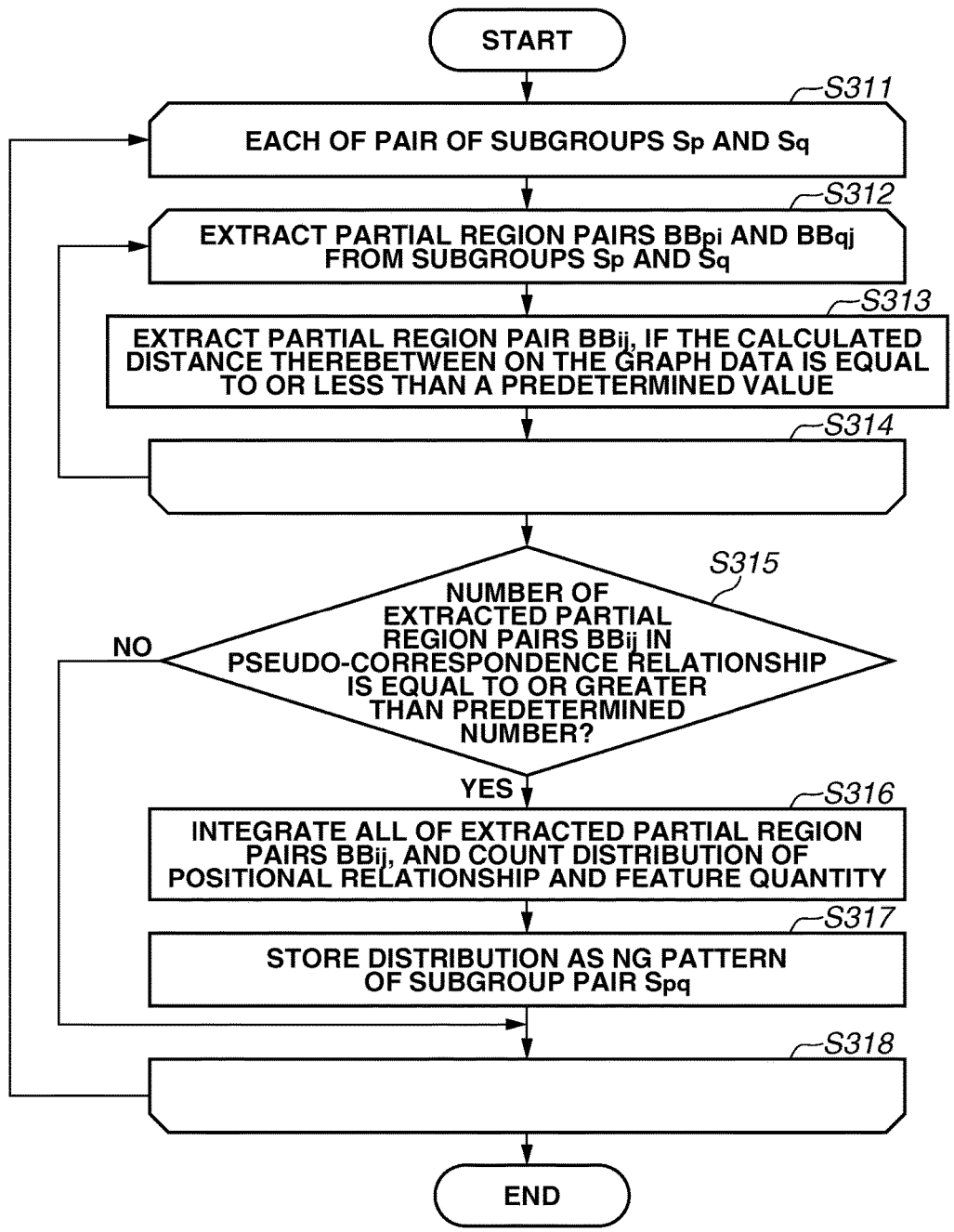
FIG. 9 is a flowchart illustrating image recognition learning processing according to a third exemplary embodiment.

In steps S311 to S314 in FIG. 9, the learning program counts the pseudo-correspondence patterns for each subgroup of the image database, and checks whether there is a specific pattern. In steps S312 and S313, at first, the partial regions $BB_{pi}$ and $BB_{qj}$ are extracted from a pair of specific subgroups $S_p$ and $S_q$, and the geodetic distance between the partial region pairs $BB_{pi}$ and $BB_{qj}$ is calculated using the formula 5. If the calculated distance is equal to or less than a predetermined value, the region pairs are the pseudo-correspondence pattern arising in the subgroup pair $S_{pq}$. Accordingly, in step S313, such a region pair is extracted and stored. As described above, in steps S311 to S314, the learning program executes the above-described processing on all of the partial region pairs $BB_{ij}$.

Then, if the number of the extracted pseudo-correspondence patterns is equal to or greater than a predetermined number (YES in step S315), the processing proceeds to step S316. In step S316, the relative position relations of all of the extracted pseudo-correspondence patterns are added up. In step S317, a distribution profile of that pseudo-correspondence pattern is stored as a prior distribution of the NG pattern of the subgroup pair $S_{pq}$. In the present exemplary embodiment, an NG pattern p-q is counted as a prior distribution of the NG pattern. The NG pattern p-q occurs when the partial region in the subgroup $S_q$ is mixed with the target region $ROI_p$ in the subgroup $S_p$.

As a specific processing procedure, at first, (1) an image of the partial region $BB_{pi}$ as the pseudo-correspondence pattern is acquired, which corresponds to a front window in FIG. 10A. Next, (2) similar regions of the partial region $BB_{pi}$ are combined, and a target region $ROI_{pi}$ is created. Then, (3) a prior distribution that illustrates a positional relationship between the target region $ROI_{pi}$ and the partial region $BB_{qi}$ as the pseudo-correspondence pattern is acquired. In the present exemplary embodiment, as illustrated in the diagram on the left side in FIG. 10B, each of the target regions is normalized to a square shape. Then, the center positions of the partial regions $BB_{qi}$ are added up. At this time, as illustrated in the diagram on the right side in FIG. 10B, (4) information about distributions of the feature quantities of the partial regions $BB_{pi}$ and $BB_{qj}$ are also counted and stored.

According to the present exemplary embodiment, the learning program learns the NG pattern p-q as described above. In a case where the NG pattern q-p is counted, the above-described processing will be executed by exchanging the index symbols p and q. Through the above processing, the learning program learns a distribution having a clear peak for the highly-reproducible NG pattern, and thus identification can be easily executed at the recognition phase.

Figure 12:
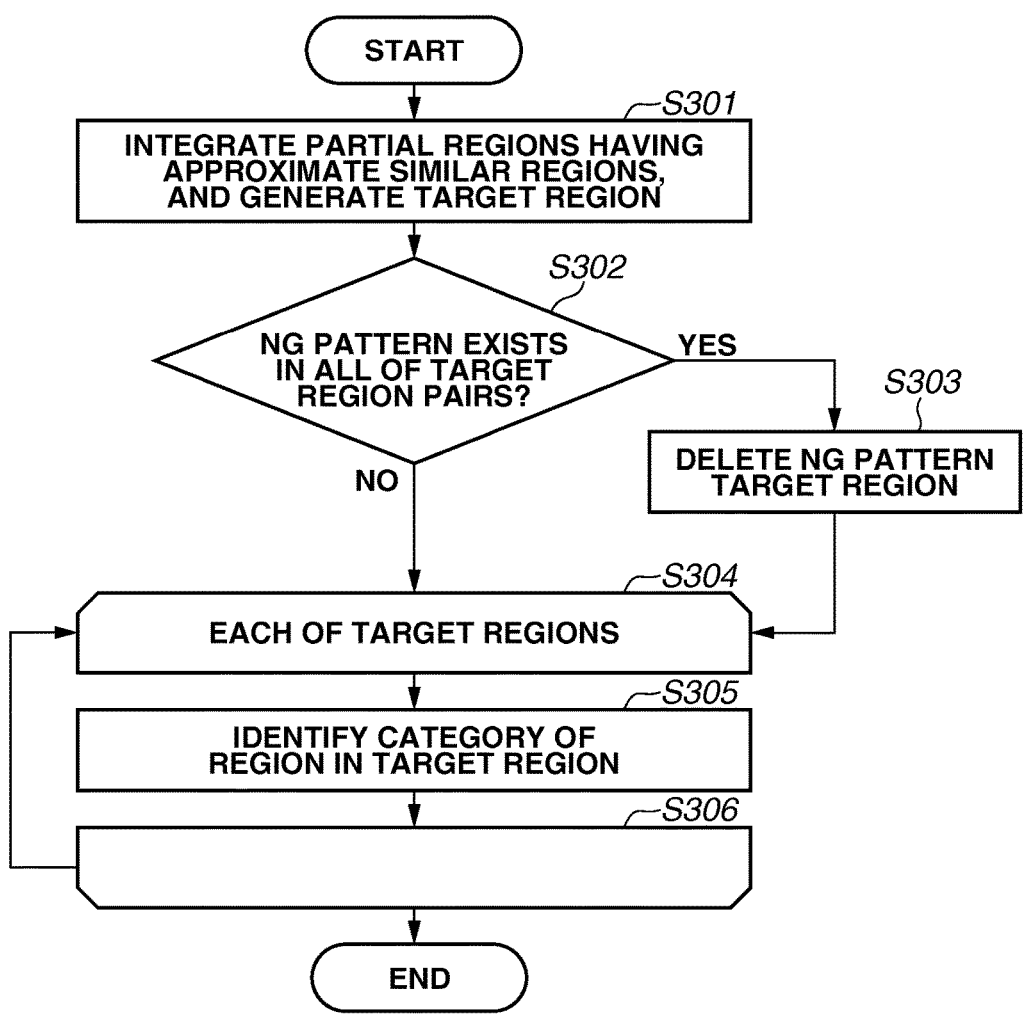
FIG. 12 is a flowchart illustrating image recognition processing according to the third exemplary embodiment.

Subsequently, recognition phase processing executed by the image processing apparatus according to the present exemplary embodiment will be described. FIG. 12 is a flowchart illustrating a processing flow that is executed at the recognition phase according to the present exemplary embodiment. First, in step S301, the target region determination unit 105 generates target regions. Next, in step S302, the target region determination unit 105 makes a pair of overlapping target regions among the generated target regions, and checks whether the positional relationship between the pair of target regions and the partial region and the feature quantity correspond to the prior distribution of the NG pattern learned previously. In a case where the positional relationship between the target region and the partial region and the feature quantity correspond to the prior distribution of the NG pattern (YES in step S302), the processing proceeds to step S303. In step S303, the target region having a high NG pattern likelihood score is deleted. Thereafter, the same processing described in the first exemplary embodiment is executed, and the category of the partial region in the target region is identified by the category identification unit 106.

In the present exemplary embodiment, a learning phase is previously set to the learning program in order to count the NG patterns. However, the learning program may determine whether the similar region inquiry result corresponds to the pseudo-correspondence relationship by searching for the NG pattern in the recognition phase. FIG. 11B is a conceptual diagram illustrating the above-described method.

In FIG. 11B, a region "a" (e.g., a front window) in the acquired image is similar to both regions "x" (e.g., a lake surface) and "y" (e.g., a front window of another automobile) in the image database. A region "b" (e.g., an automobile body) in the acquired image has the similarity relationship with a region "z" (e.g., a body of another automobile) in the image database. Further, in FIG. 11B, it is previously known that the region "x" (the lake surface) and the region "y" (the front window of another automobile) have a pseudo-correspondence relationship from the true values of the categories stored in the image database. Therefore, if the regions "a", "x", and "y" are included in the same object, this will conflict with the above-described situation. Accordingly, it is determined that either one of the inquiry results of the similar regions "a→x" and "a→y" is incorrect. On the other hand, because the regions "y" (the front window of another automobile) and "z" (the body of another automobile) have high similarity and constitutes the same object, it is determined that corresponding regions "a" and "b" are likely to belong to the same object.

Therefore, in the present exemplary embodiment, the correspondence relationship of the regions "a→x" is hypothesized to be in a pseudo-correspondence relationship, and that the correspondence relationship of the regions "a→y" is hypothesized to be in a pseudo-correspondence relationship. Then, target regions are generated for each of the hypothetical cases, and a target region with higher consistency is determined and selected as a correct pattern. Herein, the consistency is determined based on a standard in which the consistency is lower as the target regions in different categories overlap each other by larger amount. In other words, if the target regions of the automobile and a surface of the lake overlap each other by a large amount, it is determined that the consistency thereof is low. By making a determination using the above-described consistency, according to the present exemplary embodiment, it is possible to acquire a correct result in which the regions "y" and "z" corresponding to the regions "a" and "b" belong to the same target region (i.e., an automobile body) as illustrated in a schematic diagram in FIG. 11B2 on the right side of FIG. 11B.

As described above, according to the present exemplary embodiment, determination of the target region and identification of the region category are executed based on the information about the pseudo-correspondence relationship between the partial regions in the image database. With this configuration, it is possible to reduce the possibility of incorrectly identifying the category. In addition, the configuration described in the present exemplary embodiment can be widely applied to an identification method using information about a true-correspondence relationship and a pseudo-correspondence relationship between the regions. Further, as described above with reference to FIGS. 11A and 11B, the present exemplary embodiment can employ a plurality of methods for deleting a pseudo-correspondence relationship.

As a fourth exemplary embodiment of the present invention, a configuration for executing processing for collating an object between images will be described. Further, the same numerals are applied to the configurations already described in the above-described exemplary embodiments, and description thereof will be omitted. An image processing apparatus according to the present exemplary embodiment includes the configuration (function unit) similar to that of the image processing apparatus according to the first exemplary embodiment illustrated in FIG. 1.

Figure 13A:
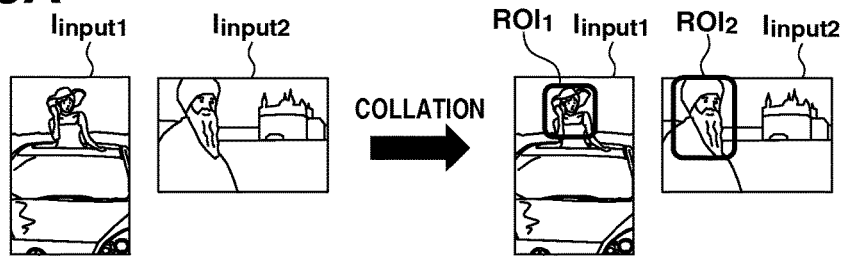
FIGS. 13A, 13B, 13C, and 13D are diagrams each illustrating collation of images according to a fourth exemplary embodiment.

FIGS. 13A, 13B, 13C, and 13D are diagrams illustrating collation processing of the images according to the present exemplary embodiment. "Collation processing" refers to processing for automatically extracting regions containing an object common to images $I_{input1}$ and $I_{input2}$ when these images are received (i.e., acquired). FIG. 13A is a diagram illustrating an example of collation processing in which target regions $ROI_1$ and $ROI_2$, which contains human bodies, are extracted as the objects common to two images. Hereinafter, processing according to the present exemplary embodiment will be described in detail with reference to conceptual diagrams of FIGS. 13A, 13B, 13C and 13D illustrating the collation processing, and a flowchart of FIG. 14 illustrating the image recognition processing according to the present exemplary embodiment.

Figure 14:
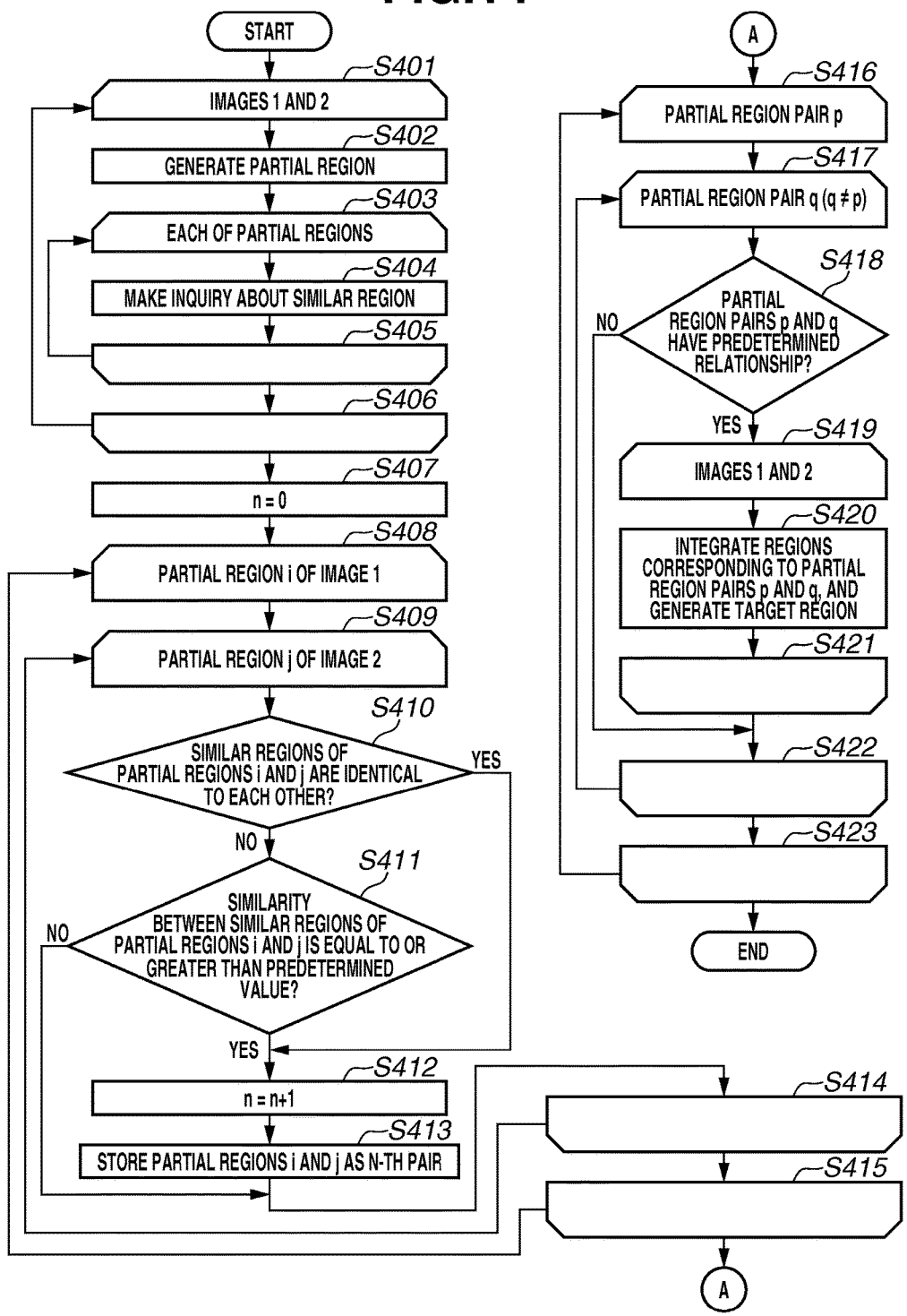
FIG. 14 is a flowchart illustrating image recognition processing according to the fourth exemplary embodiment.

As illustrated in FIG. 14, in steps S401 and S402, the region dividing unit 102 divides respective acquired two images into a plurality of partial regions through the same processing described in the first exemplary embodiment. In steps S403 to S405, the similar region inquiry unit 103 inquires about a similar region for each of the generated partial regions, and acquires the similar regions for the partial regions. In order to simplify the following description, a similar region of the highest similarity score is selected when a plurality of similar regions is acquired for a single partial region.

Figure 13B:
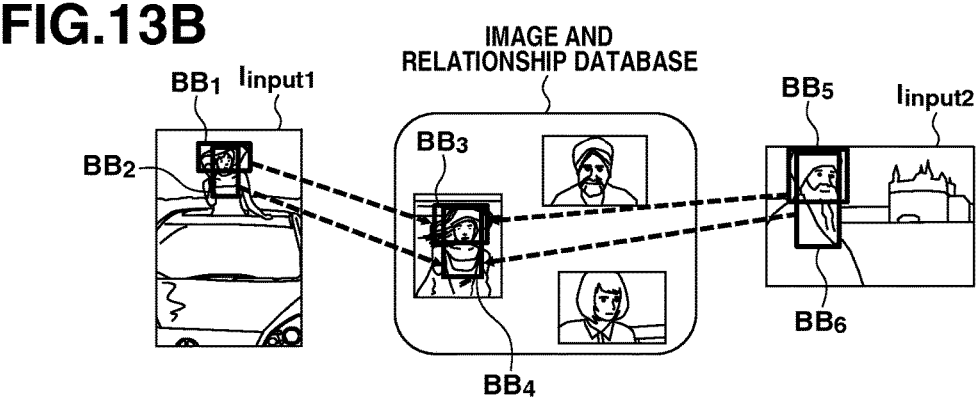

Next, in steps S407 to S415, the target region determination unit 105 extracts a pair of partial regions having a correspondence relationship between the two acquired images. More specifically, in steps S408 to S410, with respect to all of the partial region pairs, the target region determination unit 105 checks whether two partial regions having a common region as a similar region exist in the images. In step S410, if a partial region pair having a common region as a similar region exists (YES in step S410), the processing proceeds to step S412. Thereafter, in step S413, the partial region pair is extracted and stored as the partial region pair having a correspondence relationship. FIG. 13B is a diagram illustrating a partial region extraction result acquired through the above-described processing. In FIG. 13B, a partial region as a reference source of the image inquiry and a similar region as an inquiry result are connected by an arrow. Since partial regions $BB_1$ and $BB_5$ have a partial region $BB_3$ as a common similar region, the partial regions $BB_1$ and $BB_5$ are extracted as the partial region pair having the correspondence relationship. Partial regions $BB_2$ and $BB_6$ are also extracted because the partial regions $BB_2$ and $BB_6$ also have the partial region $BB_3$ as a common similar region.

Figure 13C:
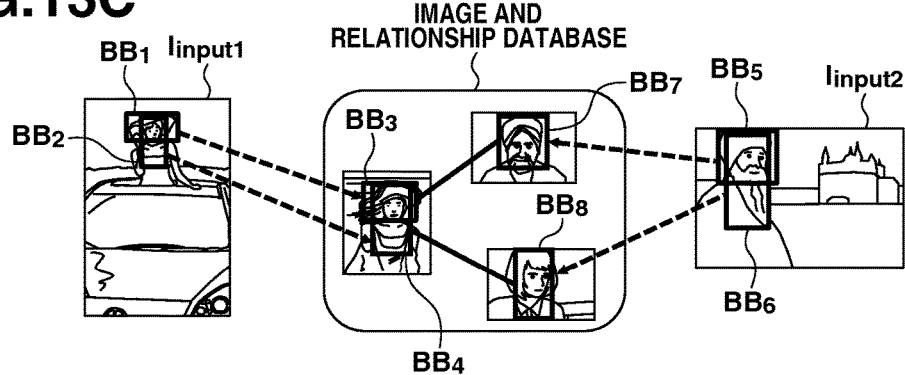

Next, in step S411, the target region determination unit 105 determines whether the partial region pair having high similarity exists in the images. If the partial region pair having high similarity exists (YES in step S411), the processing proceeds to S412. Thereafter, in step S413, the partial region pair is extracted as the partial region pair having a correspondence relationship. In the processing, similar to the second exemplary embodiment, the geodetic distance based on the relationship graph of the images is used as the similarity distance serving as the determination standard. FIG. 13C is a diagram illustrating the extraction result of the partial region pair having high similarity according to the present exemplary embodiment. FIG. 13C is a diagram schematically illustrating how the similarity between the partial regions $BB_1$ and $BB_5$ is acquired as a geodetic distance of a path extending between the partial regions $BB_1$ and $BB_5$ via the similar regions $BB_3$ and $BB_7$. In FIG. 13C, it is determined that the geodetic distance has a value less than a predetermined threshold, so that the partial regions $BB_1$ and $BB_5$ are extracted as a pair having the correspondence relationship.

Figure 13D:
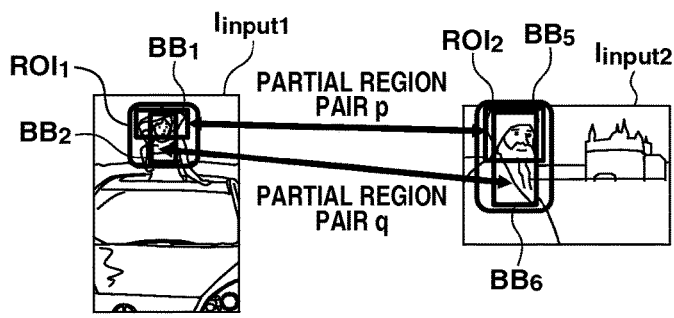

In steps S416 to S418, the target region determination unit 105 checks the partial region pairs acquired in the above-described processing, and determines whether one partial region pair is in a predetermined relationship with another partial region pair. The "predetermined relationship" refers to a state where respective partial regions constituting the partial region pair overlap each other by an amount equal to or greater than a predetermined threshold in the respective images. In FIG. 13D, if the partial regions $BB_1$ and $BB_2$ in the input image $I_{Input1}$ and the partial regions $BB_5$ and $BB_6$ in the input image $I_{Input2}$ overlap each other by an amount equal to or greater than a predetermined threshold, the target region determination unit 105 determines that the condition of "predetermined relationship" is satisfied. In the present exemplary embodiment, an overlapping amount of the partial region pairs is determined according to the above-described formula 1.

In steps S419 to S421, the target region determination unit 105 integrates the partial region pairs satisfying the above-described predetermined relationship and generates a target region. In FIG. 13D, on both images $I_{Input1}$ and $I_{Input2}$ respective partial regions are integrated and target regions $ROI_1$ and $RIO_2$ are generated.

According to the image processing apparatus described in the present exemplary embodiment, by collating the objects between the images as described above, it is possible to execute the object collation that is robust with respect to variation in the appearance or orientation of the object.

Further, as a variation example of the present exemplary embodiment, for example, a configuration may be applicable in which (1) a target region is manually set to one image and whether or not a corresponding target region exists in another image is checked. Furthermore, as another variation example, a configuration may be applicable in which (2) target regions are manually set to two images, and whether or not two target regions in the images correspond to each other is checked.

In the above-described step S404, while only one similar region is extracted for each of the partial regions, a plurality of similar regions may be extracted for one partial region. In this case, a plurality of partial region pairs in which existence of the correspondence relationship is recognized regarding each of the similar regions is extracted, and the target region may be extracted by using all of the extracted partial region pairs.

Figure 15:
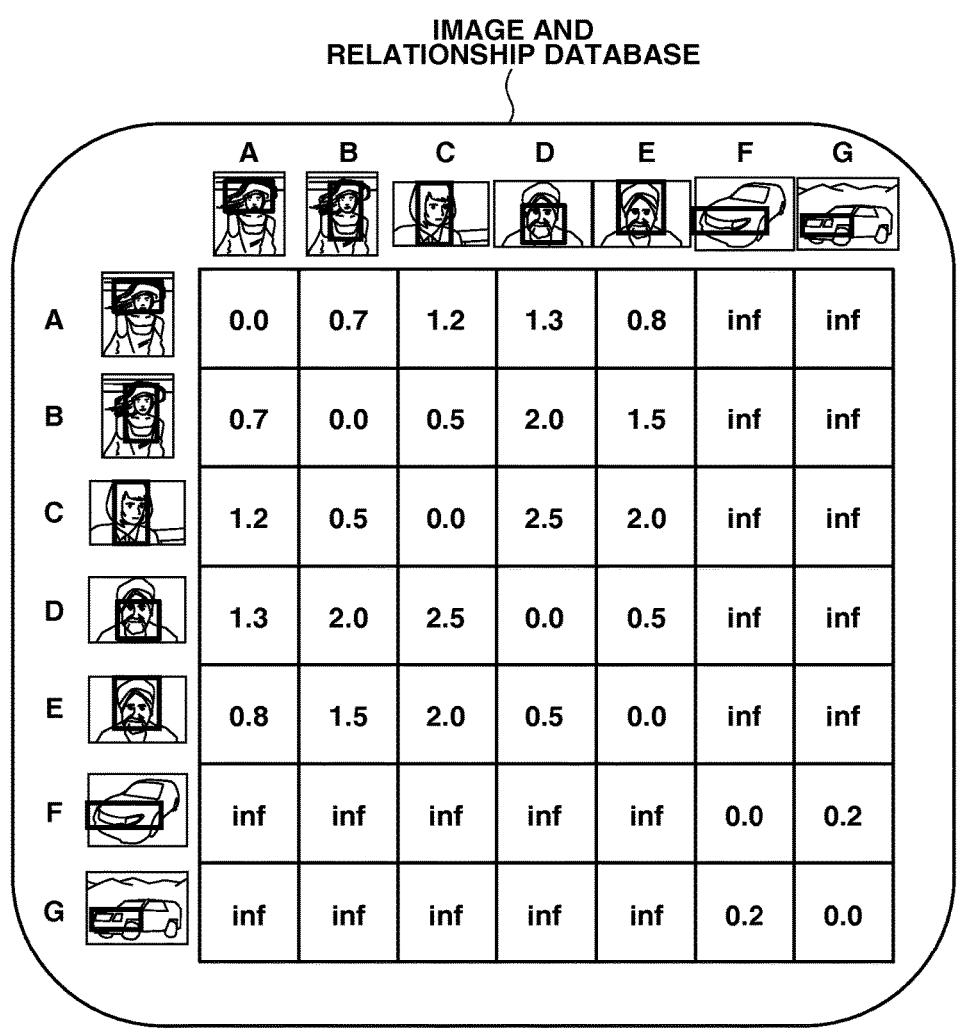
FIG. 15 is a diagram illustrating a distance matrix of geodetic distances between partial regions according to the fourth exemplary embodiment.

Further, in the above-described step S411, the geodetic distance is acquired based on the graph about relationships between images each time the similarity between the partial regions is calculated. However, another configuration can be also employed. For example, the geodetic distances between all of the partial regions may be previously acquired instead of storing the graph information about relationships between images, and the acquired geodetic distances can be stored as a distance matrix. FIG. 15 is a diagram illustrating an example of the distance matrix regarding the geodetic distances between partial regions. In FIG. 15, a similarity distance between the regions in which the path does not exist in the relationship graph is set to infinity and expressed by a symbol "inf". As described above, various configurations can be considered to express the information that can be acquired based on the graph data about relationships between images. For example, the image subgroup described in the first exemplary embodiment is one of the configurations for expressing the information based on the graph data about relationships between images. While the present invention uses the information about relationships between images, information in various configurations can be used without limitation.

Figure 16:
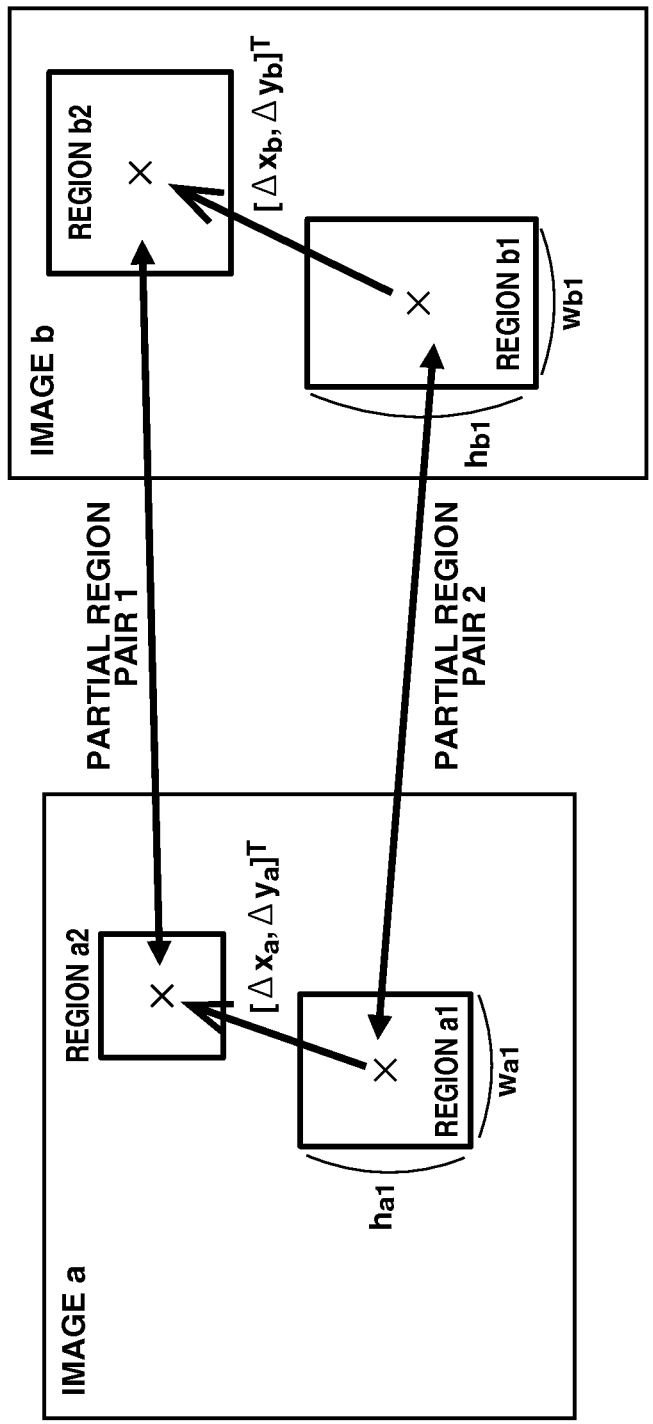
FIG. 16 is a diagram schematically illustrating another exemplary embodiment for determining a predetermined relationship according to the fourth exemplary embodiment.

Furthermore, in the above-described step S418, to determine whether the partial region pair satisfies the condition of the "predetermined relationship", the target region determination unit 105 checks the overlapping amount of the partial region pair. However, the target region determination unit 105 may determine whether the partial region pair satisfies the condition of "predetermined relationship" based on a standard other than the overlapping amount. FIG. 16 is a diagram schematically illustrating another exemplary embodiment for determining whether the predetermined relationship is satisfied. In FIG. 16, two regions "a1" and "a2" are included in an image "a", and two regions "b1" and "b2" are included in an image "b". In the present exemplary embodiment, the following formula 6 may be used to determine whether the relative positional relationship between the regions "a1" and "a2" is similar to the relative positional relationship between the regions "b1" and "b2" in order to determine whether the region pair satisfies the condition of the predetermined relationship.

$$\left(\frac{\Delta x_a}{w_{a1}+w_{a2}} - \frac{\Delta x_b}{w_{b1}+w_{b2}}\right)^2 + \left(\frac{\Delta y_a}{h_{a1}+h_{a2}} - \frac{\Delta y_b}{h_{b1}+h_{b2}}\right)^2 \le \theta \qquad \text{<Formula 6>}$$

Herein, values $\Delta x_a$ and $\Delta y_a$ represent offset amounts in an x-direction and a y-direction of the barycentric positions of the regions "a1" and "a2". Further, values $w_{ai}$ and $h_{ai}$ are the width and height of the region "a1", which normalize the offset amounts by size. A value $\theta$ is a predetermined threshold.

Figure 17:
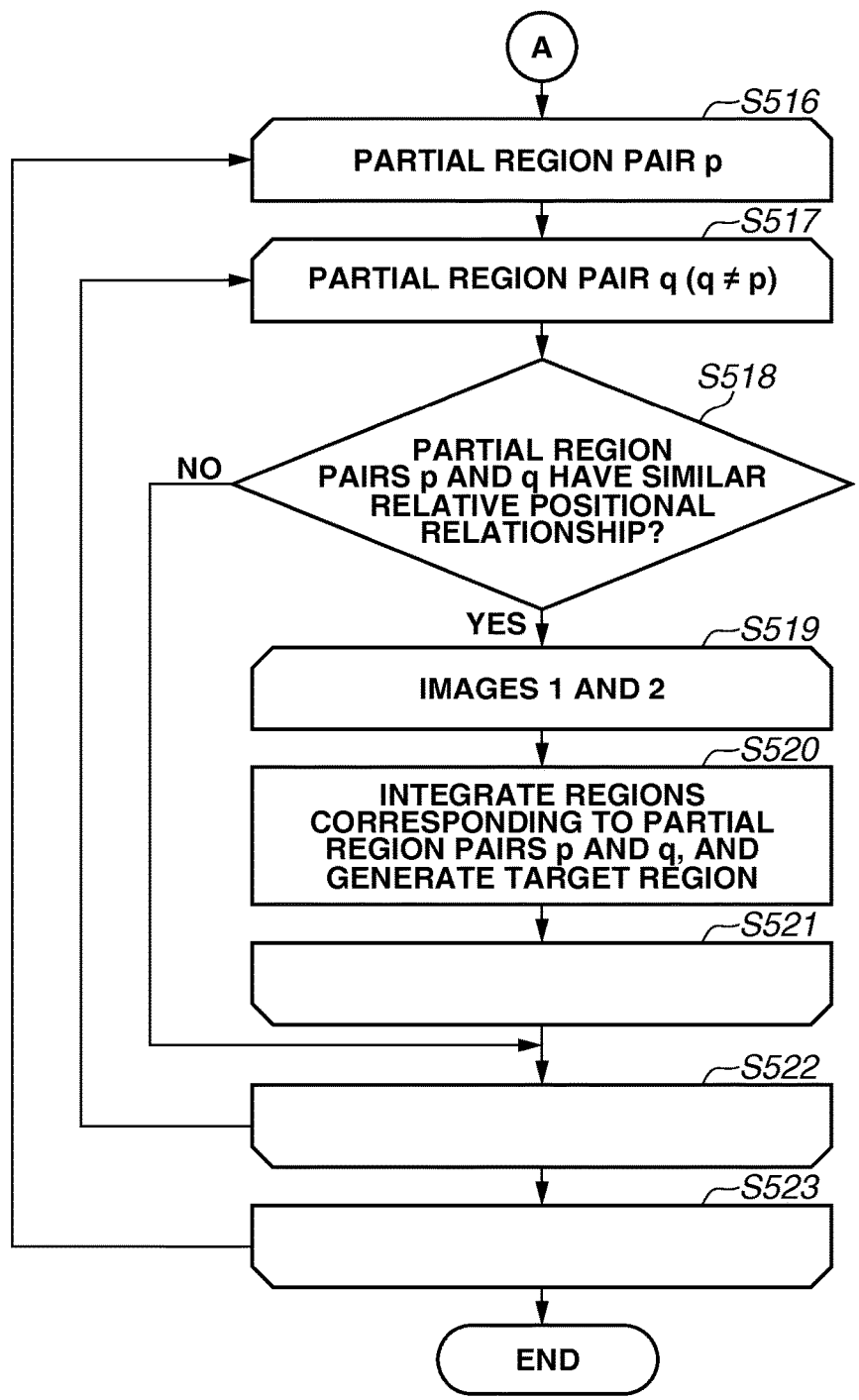
FIG. 17 is a flowchart illustrating processing for determining a predetermined relationship according to the fourth exemplary embodiment.

The processing flow using the above-described method is illustrated in FIG. 17. In steps S516 and S517, partial region pairs "p" and "q" are extracted. In step S518, based on the above-described formula 6, it is determined whether the positional relationship of the partial region pairs "p" and "q" are similar to each other. If it is determined that the positional relationships are similar to each other (YES in step S518), the processing proceeds to step S519. In steps S519 and S520, the target region determination unit 105 integrates the partial regions corresponding to the partial region pairs "p" and "q" and generates a target region. In the above-described processing, it has been determined whether each pair of partial regions has the similarity relationship. However, the target region determination unit 105 may check whether three or more partial regions have the similarity relationship. Further, with respect to the processing for acquiring the target region, the target region that straddles a plurality of the partial regions having the analogous relationship of the image may be acquired by employing the method using the geodetic distance illustrated in FIG. 6.

Other Exemplary Embodiment

Figure 18:
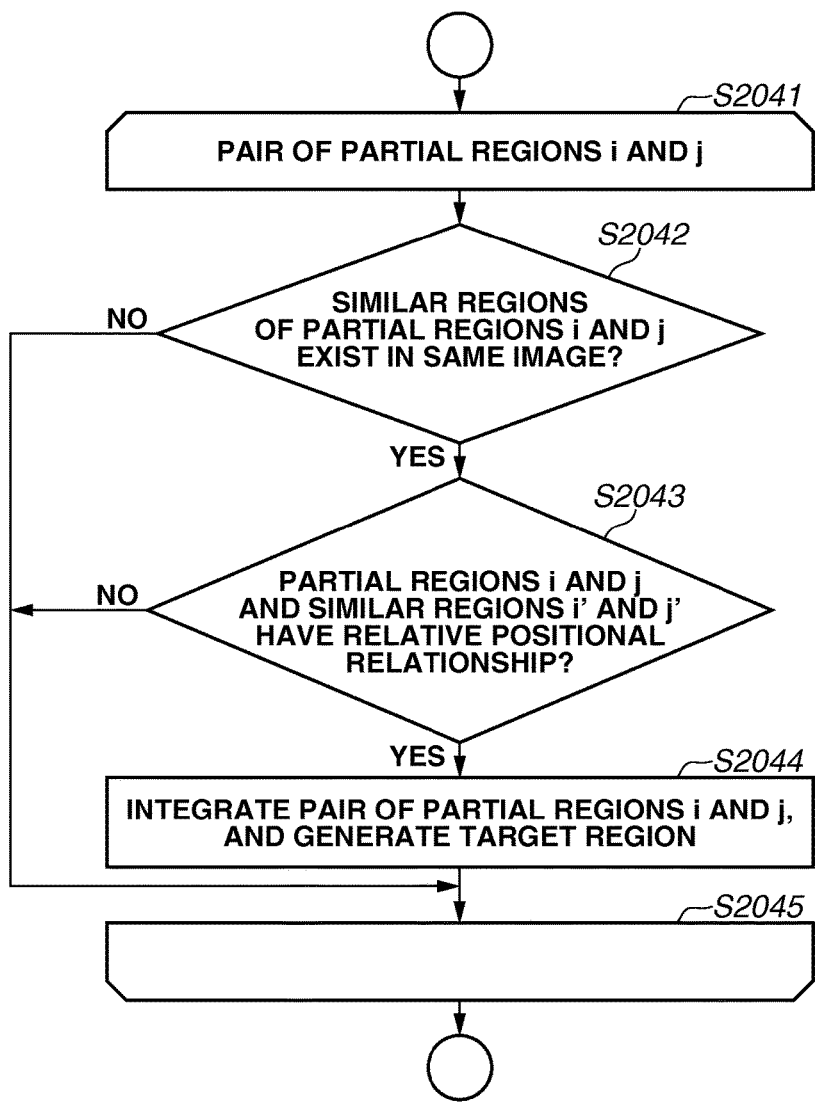
FIG. 18 is a flowchart illustrating processing for determining a predetermined relationship according to another exemplary embodiment.

In the above-described fourth exemplary embodiment, the target region determination unit 105 checks whether there is a predetermined relationship (i.e., similarity) between the positional relationship of the partial region pair in the acquired image and the positional relationship of the partial region pair in another image to determine the target region. The above-described method is applicable to other exemplary embodiments. For example, in step S204 of FIG. 7 described in the second exemplary embodiment, if it is determined that the two partial regions are related to each other after the relationship between two partial regions is checked, these partial regions are integrated and the target region is generated. FIG. 18 is a flowchart illustrating a processing flow in which the target region determination method described in the fourth exemplary embodiment is employed in replacement of the processing in step S204 described in the second exemplary embodiment.

In the second exemplary embodiment, as illustrated in FIG. 8A, the partial regions $BB_1$ and $BB_4$ are created in the input image $I_{input}$. According to the processing flow in FIG. 18, in steps S2041 and S2042, the target region determination unit 105 checks whether a similar region corresponding to each of the partial regions $BB_1$ and $BB_4$ exist in a single similar image. In FIG. 18, it is determined that similar regions $BB_2$ and $BB_3$ exist in a single similar image $I_1$.

Next, in step S2043, the target region determination unit 105 specifies the partial regions $BB_1$ and $BB_4$ as the regions "a1" and "a2", while specifying the similar regions $BB_2$ and $BB_3$ as the regions "b1" and "b2", and checks whether relative positional relationships between these four regions satisfy the condition specified by the formula 6. Then, in a case where the condition specified by the formula 6 is satisfied (YES in step S2043), the processing proceeds to step S2044. In step S2044, the target region determination unit 105 regards that the partial regions $BB_1$ and $BB_4$ have the predetermined relationship, and integrates the partial regions $BB_1$ and $BB_4$ and generates a target region. As described above, the target region determination method described in the fourth exemplary embodiment is applicable to the other exemplary embodiments.

Further, in the above-described exemplary embodiments, an image processing apparatus is provided with an image data storage unit. However, the image data storage unit may be provided separately from the image processing apparatus.

According to the above-described exemplary embodiments of the present invention, an object can be detected with high precision for a main region and also for the region other than the main region in the input image, and thus the image can be precisely divided into regions for each object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-236993, filed Nov. 21, 2014, which is hereby incorporated by reference herein in its entirety.

What is claimed is:

1. An image processing apparatus comprising:
at least one processor; and
a memory storing instructions that, when executed, cause the at least one processor to:
acquire an image;
divide the acquired image into a plurality of partial regions within an image frame of the acquired image;
extract one or more pieces of similar image data from each of the plurality of divided partial regions;
determine a target region, in the image frame of the acquired image, including partial regions having a relationship with each other indicative of a common object, based on information about a relationship of the acquired image the extracted image data; and
collate whether a plurality of the regions, in a plurality of the acquired images, including partial regions having a relationship with each other is related to each other based on the information used for determining the relative positional relationship between the plurality of the partial regions.

2. The image processing apparatus according to claim 1, wherein a storage device is included in the image processing apparatus.

3. The image processing apparatus according to claim 1, wherein the instructions further cause the at least one processor to:
output information about the region including partial regions having the relationship, with respect to the acquired image.

4. The image processing apparatus according to claim 1, wherein the information about the relationship of a plurality of pieces of the image data includes information used for determining a correspondence relationship between the plurality of partial regions.

5. The image processing apparatus according to claim 4, wherein the information about the relationship of the plurality of pieces of the image data includes information about graph data including a node that is one of a plurality of partial regions produced by dividing the plurality of pieces of the image data and an edge representing a correspondence relationship between the partial regions into which the image data is divided.

6. The image processing apparatus according to claim 5, wherein the graph data includes an edge that is weighted based on similarity of the partial regions in the plurality of pieces of the image data.

7. The image processing apparatus according to claim 6, wherein the weighted edge is acquired based on a teacher value about a category of an object in the plurality of pieces of the image data.

8. The image processing apparatus according to claim 5, wherein the information about the relationship of the plurality of pieces of the image data is information about a subgroup acquired by clustering the plurality of pieces of the image data based on the graph data.

9. The image processing apparatus according to claim 8, wherein the instructions further cause the at least one processor to:
identify a category of the region including partial regions having the relationship with each other based on the information about the subgroup.

10. The image processing apparatus according to claim 9, wherein the identification unit further uses a trained identification dictionary to identify a category of the region including partial regions having the relationship with each other.

11. The image processing apparatus according to claim 5, wherein the information about the relationship of the plurality of pieces of the image data includes information for determining an incorrect correspondence relationship between the plurality of partial regions.

12. The image processing apparatus according to claim 1, wherein the information about the relationship of the plurality of pieces of the image data includes meta-information about the image in the plurality of pieces of the image data; and wherein the image processing apparatus identifies a category of the region including partial regions having a relationship with each other, based on the meta-information about the image.

13. The image processing apparatus according to claim 12, wherein the meta-information is an annotation label about an object or a portion of the object in the plurality of pieces of the image data.

14. The image processing apparatus according to claim 1, wherein the information about the relationship of the plurality of pieces of the image data is information used for determining a relative positional relationship between the plurality of the partial regions.

15. An image processing apparatus comprising:

at least one processor; and a memory storing instructions that, when executed, cause the at least one processor to:

acquire an image;

divide the acquired image into a plurality of partial regions within an image of the acquired image;

extract one or more pieces of similar image data from each of the plurality of divided partial regions;

determine a target region, in the image frame of the acquired image, including partial regions having a relationship with each other indicative of a common object, based on a teacher value about a category of an object relating to the extracted image data;

collate whether a plurality of the regions, in a plurality of the acquired images, including partial regions having a relationship with each other is related to each other based on the teacher value used in determining a relative positional relationship between the plurality of the partial regions.

16. The image processing apparatus according to claim 15, wherein the instructions further cause the at least one processor to determine a category of the determined region.

17. An image processing method comprising:

acquiring an image;

dividing the acquired image into a plurality of partial regions within an image frame of the acquired image;

extracting one or more pieces of similar image data from each of the plurality of divided partial regions;

determining a target region, in the image frame of the acquired image, including partial regions having a relationship with each other indicative of a common object, based on the extracted image data and information about a relationship of the image data; and collating whether a plurality of the regions, in a plurality of the acquired images, including partial regions having a relationship with each other is related to each other based on the information used in determining a relative positional relationship between the plurality of partial regions.

18. A non-transitory computer-readable recording medium that stores a program, that when executed, causes a computer to function as an image processing apparatus by executing a method, the method comprising:

acquiring an image;

dividing the acquired image into a plurality of partial regions within an image frame of the acquired image;

extracting one or more pieces of similar image data from each of the plurality of divided partial regions from a storage; and determining a target region, in the image frame of the acquired image, including partial regions having a relationship with each other indicative of a common object, based on information about a relationship of the acquired image the extracted image data and collating whether a plurality of the regions, in a plurality of the acquired images, including partial region having a relationship with each other is related to each other based on the information used in determining a relative positional relationship between the plurality of partial regions.

* * * * *